United States Patent
Solheid et al.

(10) Patent No.: US 12,169,318 B2
(45) Date of Patent: Dec. 17, 2024

(54) TELECOMMUNICATIONS EQUIPMENT FRAME

(71) Applicant: COMMSCOPE TECHNOLOGIES LLC, Hickory, NC (US)

(72) Inventors: James J. Solheid, Minneapolis, MN (US); Rodney C. Schoenfelder, Shakopee, MN (US); Scott Jean Anderson, Burnsville, MN (US); James J. Brandt, St. Louis Park, MN (US); Matthew J. Holmberg, Le Center, MN (US); Patrick James Thompson, Prior Lake, MN (US); David Patrick Percival, Tabernash, CO (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 17/269,656

(22) PCT Filed: Aug. 20, 2019

(86) PCT No.: PCT/US2019/047182
§ 371 (c)(1),
(2) Date: Feb. 19, 2021

(87) PCT Pub. No.: WO2020/041255
PCT Pub. Date: Feb. 27, 2020

(65) Prior Publication Data
US 2021/0173165 A1    Jun. 10, 2021

Related U.S. Application Data

(60) Provisional application No. 62/720,057, filed on Aug. 20, 2018, provisional application No. 62/720,784, (Continued)

(51) Int. Cl.
G02B 6/44    (2006.01)

(52) U.S. Cl.
CPC ....... *G02B 6/4452* (2013.01); *G02B 6/44526* (2023.05); *G02B 6/44528* (2023.05); *G02B 6/4454* (2013.01); *G02B 6/4457* (2013.01)

(58) Field of Classification Search
CPC .............. G02B 6/4452; G02B 6/44526; G02B 6/44528; G02B 6/4454; G02B 6/4457; H04Q 1/06; H04Q 1/09
(Continued)

(56) References Cited

U.S. PATENT DOCUMENTS

| 4,266,853 A | 5/1981 | Hutchins et al. |
| 4,995,688 A | 2/1991 | Anton et al. |

(Continued)

FOREIGN PATENT DOCUMENTS

| WO | 2013/092251 A1 | 6/2013 |
| WO | 2020/041255 A1 | 2/2020 |

OTHER PUBLICATIONS

Flex Frame Splice Cabinet: User Manual, TC-96272-IP, CommScope®, 20 pages (Jun. 2019).
(Continued)

*Primary Examiner* — Daniel Petkovsek
(74) *Attorney, Agent, or Firm* — Merchant & Gould P.C.

(57) ABSTRACT

A telecommunications equipment frame including a base, and two vertical uprights, and a top member; the upright members defining an upper equipment zone and a lower cable tray zone. One or more front trays are in the lower cable tray zone, and openings are provided through the frame to one or more rear trays. The equipment zone defined by the two uprights is open without cable management structure for receiving telecommunications equipment. At least one slack storage zone adjacent to the central zone includes a plurality of cable management devices for storing cable slack.

15 Claims, 44 Drawing Sheets

Related U.S. Application Data filed on Aug. 21, 2018, provisional application No. 62/803,961, filed on Feb. 11, 2019.

(58) Field of Classification Search
USPC .................................................. 385/134–137
See application file for complete search history.

(56) References Cited

U.S. PATENT DOCUMENTS

| | | | |
|---|---|---|---|
| 6,535,682 B1 * | 3/2003 | Puetz .................. | G02B 6/4452 385/137 |
| 6,792,191 B1 | 9/2004 | Clapp, Jr. et al. | |
| 9,709,765 B2 | 7/2017 | Wells et al. | |
| 2003/0190035 A1 | 10/2003 | Knudsen et al. | |
| 2004/0146266 A1 * | 7/2004 | Solheid .................. | H04Q 1/13 385/135 |
| 2004/0228598 A1 * | 11/2004 | Allen .................. | G02B 6/4452 385/135 |
| 2008/0080829 A1 * | 4/2008 | Smith .................. | H04Q 1/14 385/135 |
| 2008/0212928 A1 | 9/2008 | Kowalczyk et al. | |
| 2008/0247723 A1 | 10/2008 | Herzog et al. | |
| 2010/0125998 A1 | 5/2010 | Kowalczyk et al. | |
| 2013/0134116 A1 | 5/2013 | Taylor | |
| 2016/0259129 A1 | 9/2016 | Geens et al. | |
| 2017/0045701 A1 * | 2/2017 | Diepstraten .......... | G02B 6/3897 |
| 2017/0235067 A1 | 8/2017 | Holmberg et al. | |
| 2017/0343755 A1 | 11/2017 | Landry et al. | |
| 2018/0045904 A1 | 2/2018 | Smith et al. | |
| 2018/0224621 A1 | 8/2018 | Campbell et al. | |
| 2018/0284377 A1 | 10/2018 | Chiron et al. | |
| 2022/0196956 A1 | 6/2022 | Schoenfelder et al. | |

OTHER PUBLICATIONS

International Search Report and Written Opinion of the International Searching Authority for International Patent Application No. PCT/US2020/017457 mailed Jun. 15, 2020, 10 pages.

NG4access Flex Frame: Patch Cord Routing Guide, TC-96264-IP, CommScope®, 8 pages (Feb. 2019).

International Search Report and Written Opinion of the International Searching Authority for International Patent Application No. PCT/US2019/047182 mailed Dec. 13, 2019, 12 pages.

Extended European Search Report for European Patent Application No. 19852770.7 mailed Apr. 19, 2022, 8 pages.

* cited by examiner

TELECOMMUNICATIONS EQUIPMENT FRAME

CROSS-REFERENCE TO RELATED APPLICATIONS

This application is a National Stage Application of PCT/US2019/047182, filed on Aug. 20, 2019, which claims the benefit of U.S. Patent Application Ser. No. 62/720,057, filed on Aug. 20, 2018, and claims the benefit of U.S. Patent Application Ser. No. 62/720,784, filed on Aug. 21, 2018, and claims the benefit of U.S. Patent Application Ser. No. 62/803,961, filed on Feb. 11, 2019, the disclosures of which are incorporated herein by reference in their entireties. To the extent appropriate, a claim of priority is made to each of the above disclosed applications.

BACKGROUND OF THE INVENTION

Telecommunications equipment frames are known for holding equipment and managing telecommunications cables extending to and from the equipment. One common concern with telecommunications equipment frames is ease of managing the cables so as to avoid a cable mess or tangle where adding or removing cables is difficult. Another common concern is compact size for space savings, without compromising the ease of cable and equipment access. Improvements are desired

SUMMARY OF THE INVENTION

One aspect of the present invention relates to a telecommunications equipment frame including a central zone having a front and a rear and one or two slack storage zones on one side or both sides of the central zone. The central zone includes an open equipment zone positioned above a lower cable tray zone. The cable tray zone includes front trays. Openings are provided through the frame to access rear trays on a rear of the frame. The equipment zone is bounded by two upright supports for holding telecommunications equipment. There are no cable management trays in front of the equipment zone, or behind the equipment zone.

DETAILED DESCRIPTION OF THE PREFERRED EMBODIMENTS

Figure 1:
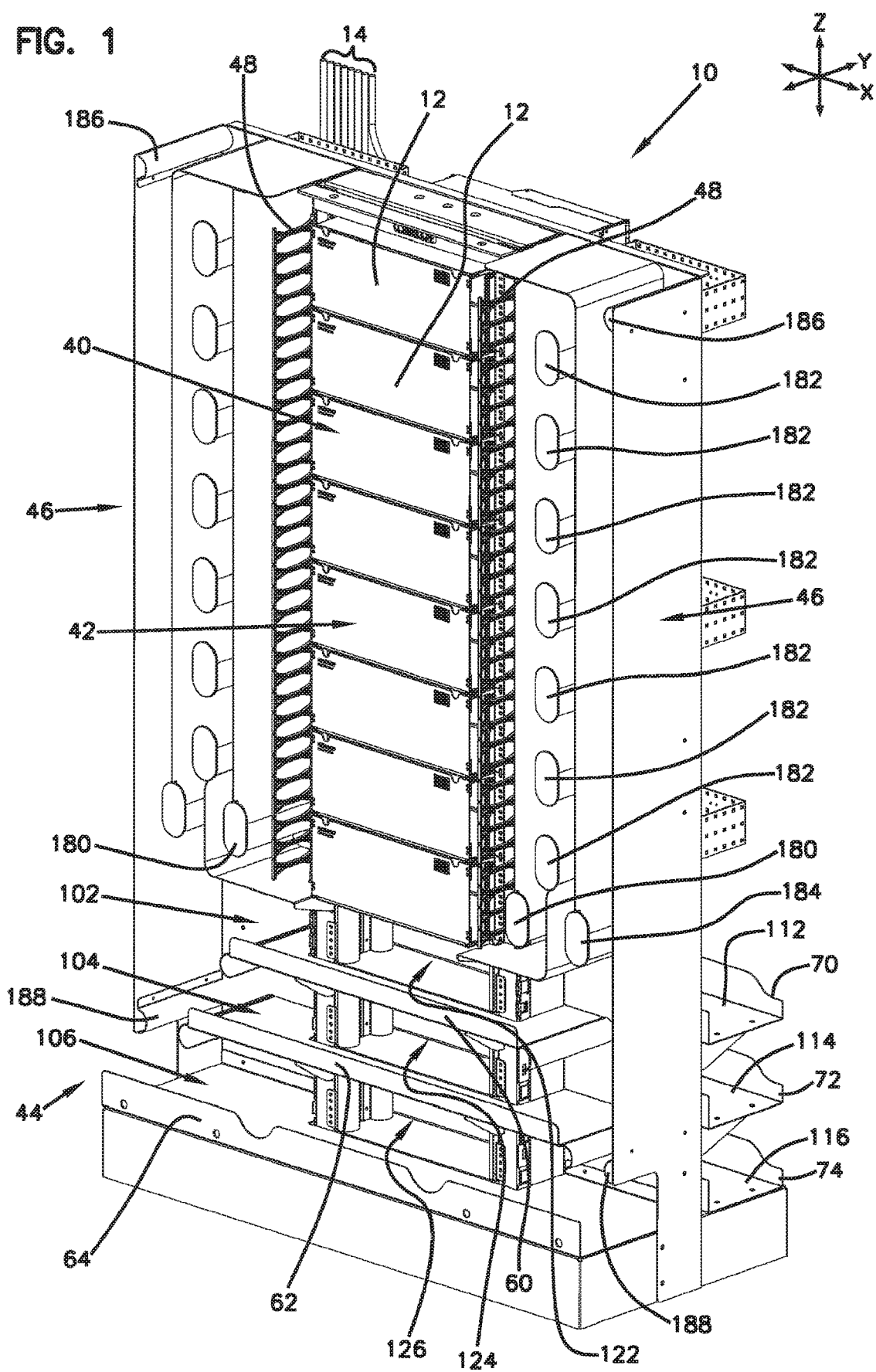
FIG. 1 is a front perspective view of a first embodiment of a telecommunications equipment frame including telecommunications equipment.
Figure 2:
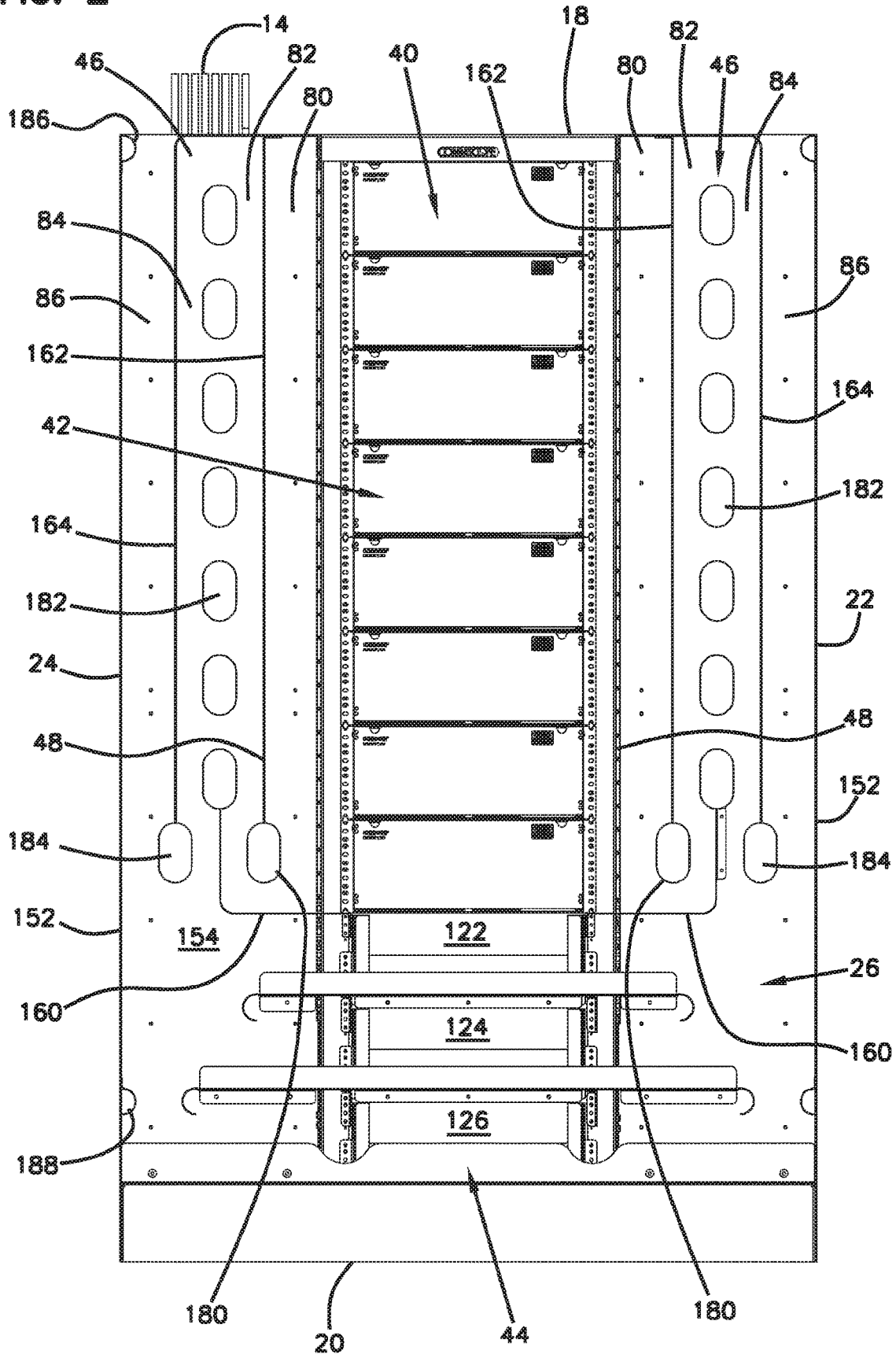
FIG. 2 is front view of the telecommunications equipment frame of FIG. 1.
Figure 3:
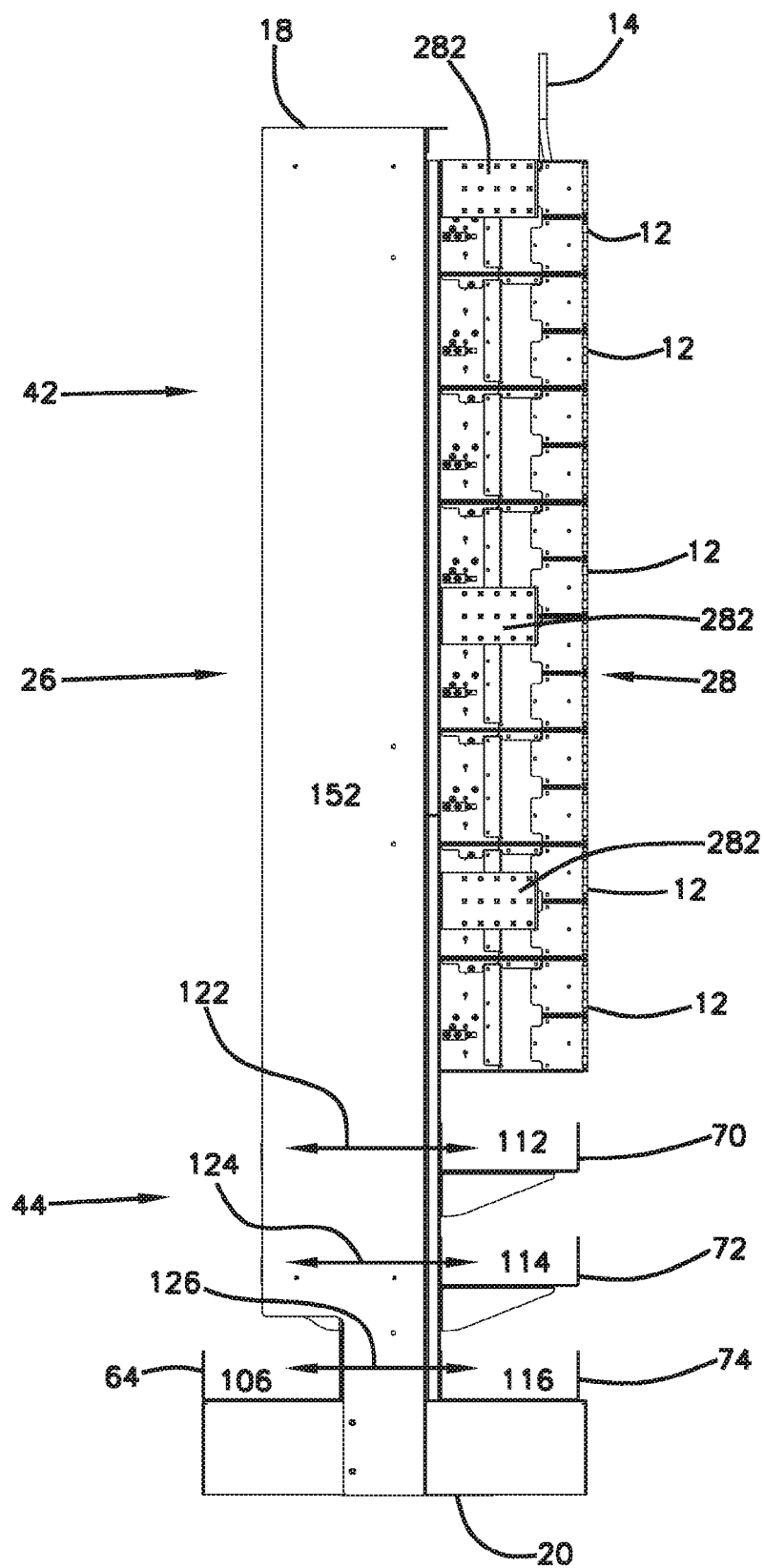
FIG. 3 is a side view of the telecommunications equipment frame of FIG. 1.
Figure 4:
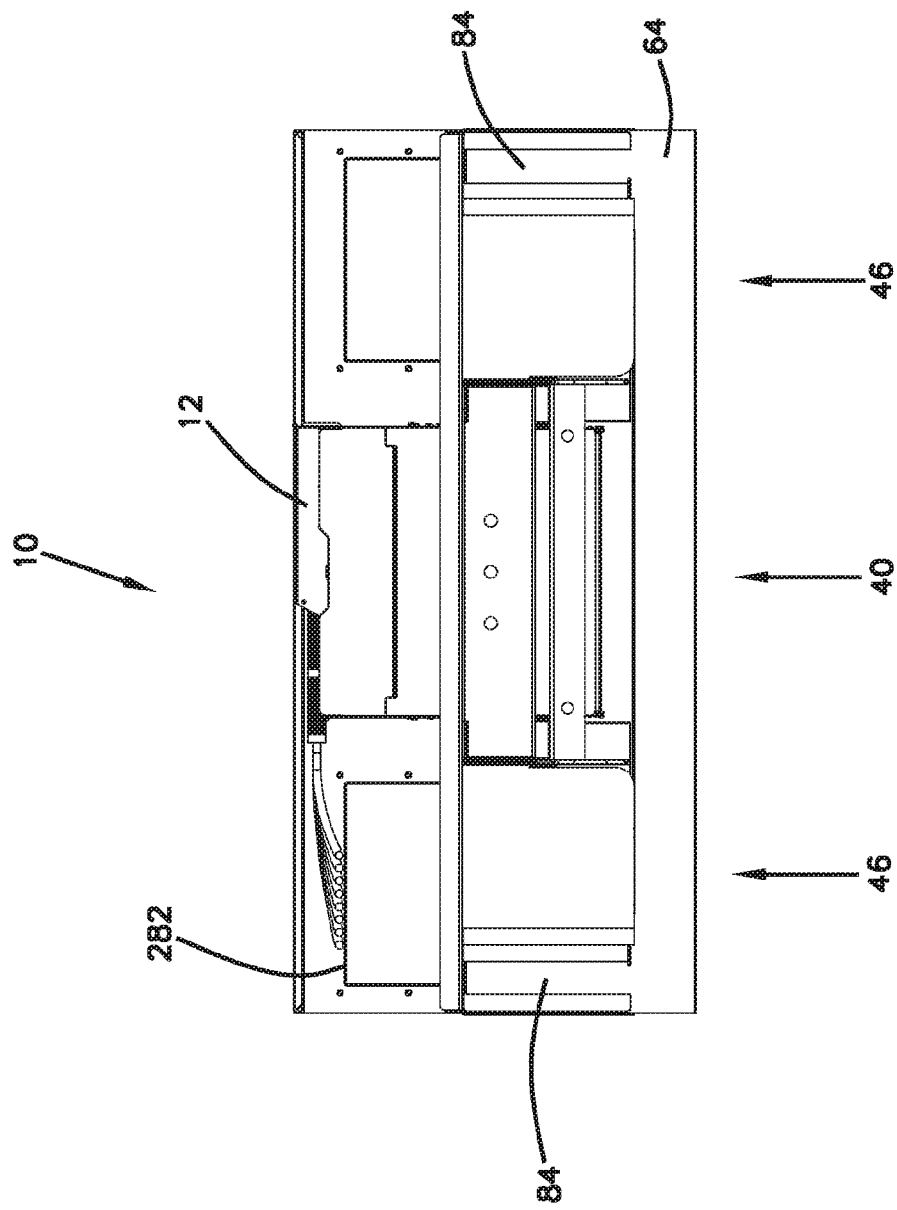
FIG. 4 is a top view of the telecommunications equipment frame of FIG. 1.
Figure 5:
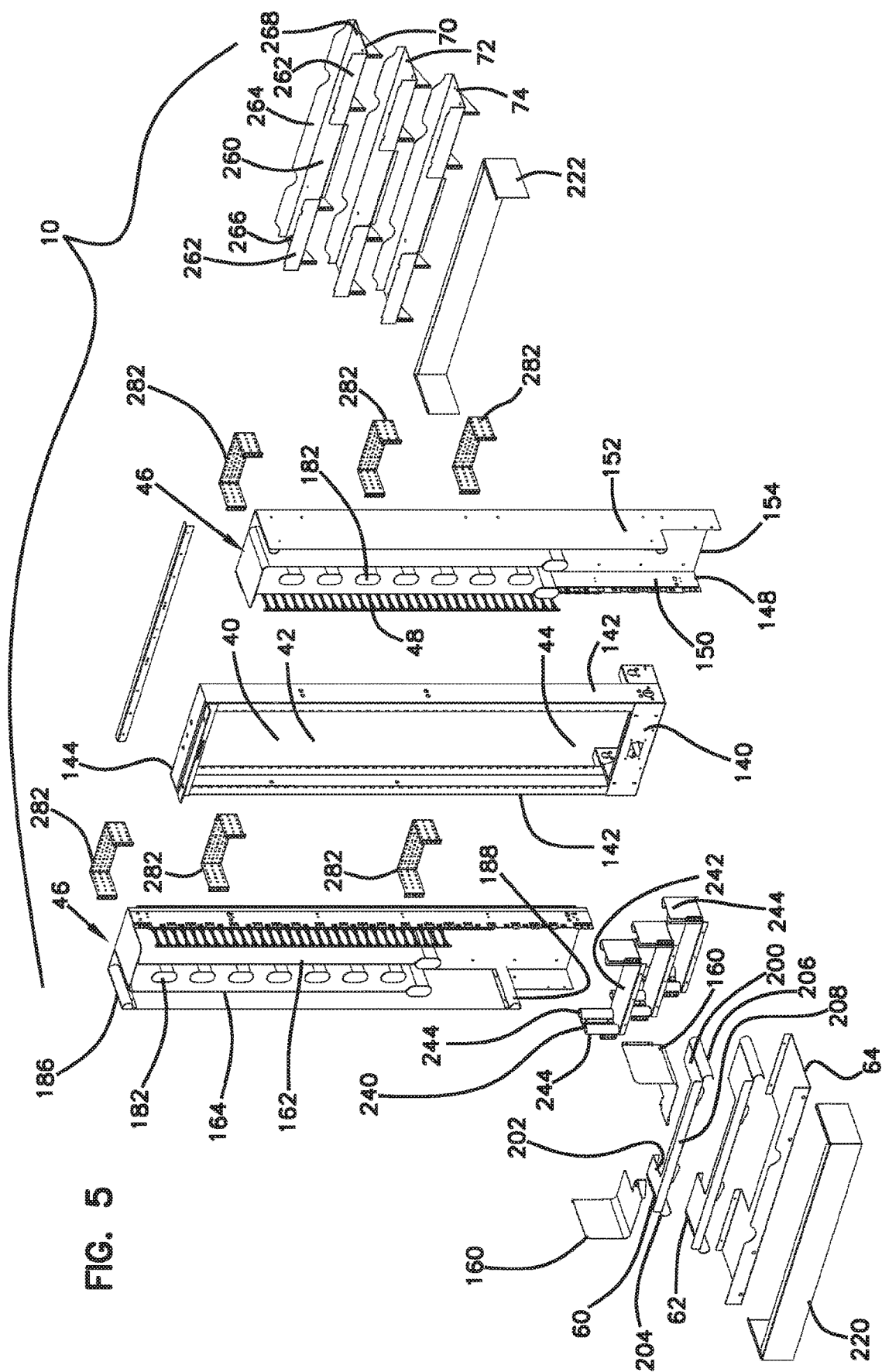
FIG. 5 is an exploded perspective view of the telecommunications equipment frame, shown without the equipment.
Figure 6:
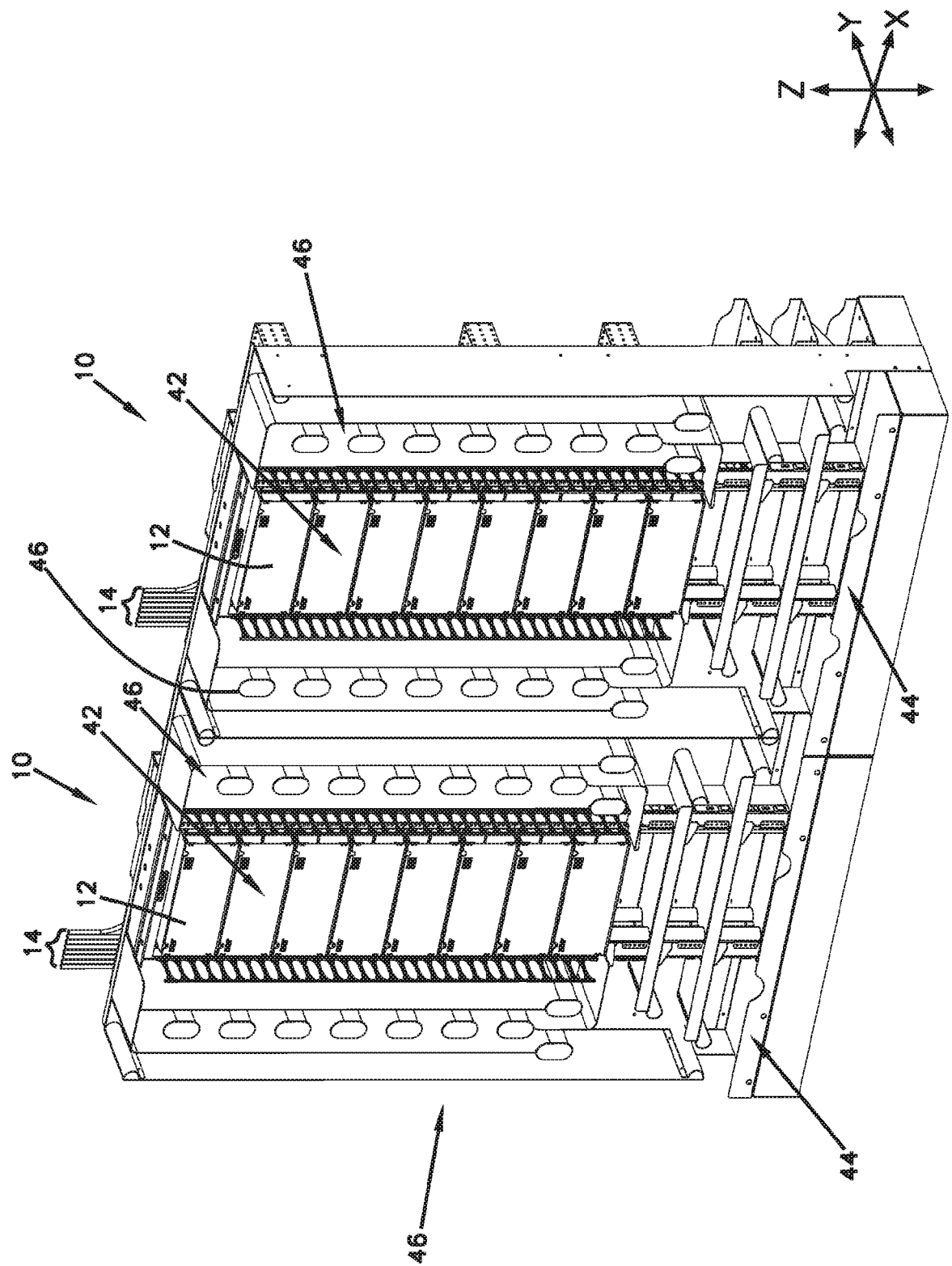
FIG. 6 is a front perspective view of two of the telecommunications equipment frames of FIG. 1 positioned side by side in a row.

Referring now to FIGS. 1-13, a telecommunications equipment frame 10, or frame 10, is shown. Frame 10 holds equipment 12 for which various cables run to and from for telecommunications connectivity. As will be described below in the example embodiments, equipment 12 has incoming and outgoing cables 14, as well as patch cables or patch cords 16 which connect different pieces of equipment 12 to each other, or to other telecommunications equipment. The preferred embodiments use fiber optic cables 14, 16.

Frame 10 includes a top 18, a bottom 20, a right side 22, and a left side 24. In the example embodiments, frame 10 is defined as including a front 26, and a rear 28. In the example embodiments, the patch cords 16 typically are managed and connected to equipment 12 on front 26 of frame 10. The incoming and outgoing cables 14 are typically managed on rear 28 of frame 10. The patch cord 16 can also be managed on rear 28 of frame 10.

Frame 10 includes a central zone 40. Central zone 40 includes an upper equipment zone 42 and a lower cable tray zone 44. On either side of central zone 40 are slack storage zones 46. In the illustrated embodiment, frame 10 includes two slack storage zones 46 which are mirror images of one another. Slack storage zone 46 includes cable management fingers 48 in a vertical column dividing the slack storage zone 46 from the central zone 40 in the area of the equipment zone 42. Management fingers support cables exiting horizontally from equipment 12.

Slack storage zone 46 further includes a first cable channel 80, a second cable channel 82, a third cable channel 84, and a fourth cable channel 86. These channels are generally vertically oriented for handling cables in various manners, as will be described herein. With respect to cable tray zone 44, the illustrated preferred embodiments include three front trays in the form of a first front tray 60, a second front tray 62, and a third front tray 64. On a rear of frame 10, three trays are also provided in the form of a first rear tray 70, a second rear tray, and a third rear tray 74. At a minimum, one front tray and one rear tray are useful for cable routing with respect to frame 10 and other frames 10 lined up in a row.

Frame 10 defines various cable pathways for the patch cables to move within frame 10, to move between frames 10 and to exit from frame 10. In general, frame 10 defines three horizontal front cable pathways 102, 104, 106. Frame 10 also further defines three rear horizontal pathways 112, 114, 116. Frame 10 further defines three front to rear pathways also extending in a horizontal direction. The front-to-rear pathways 122, 124, 126 allow for cable communication between the front horizontal pathways 102, 104, 106 and the rear horizontal pathways 112, 114, 116.

Figure 7:
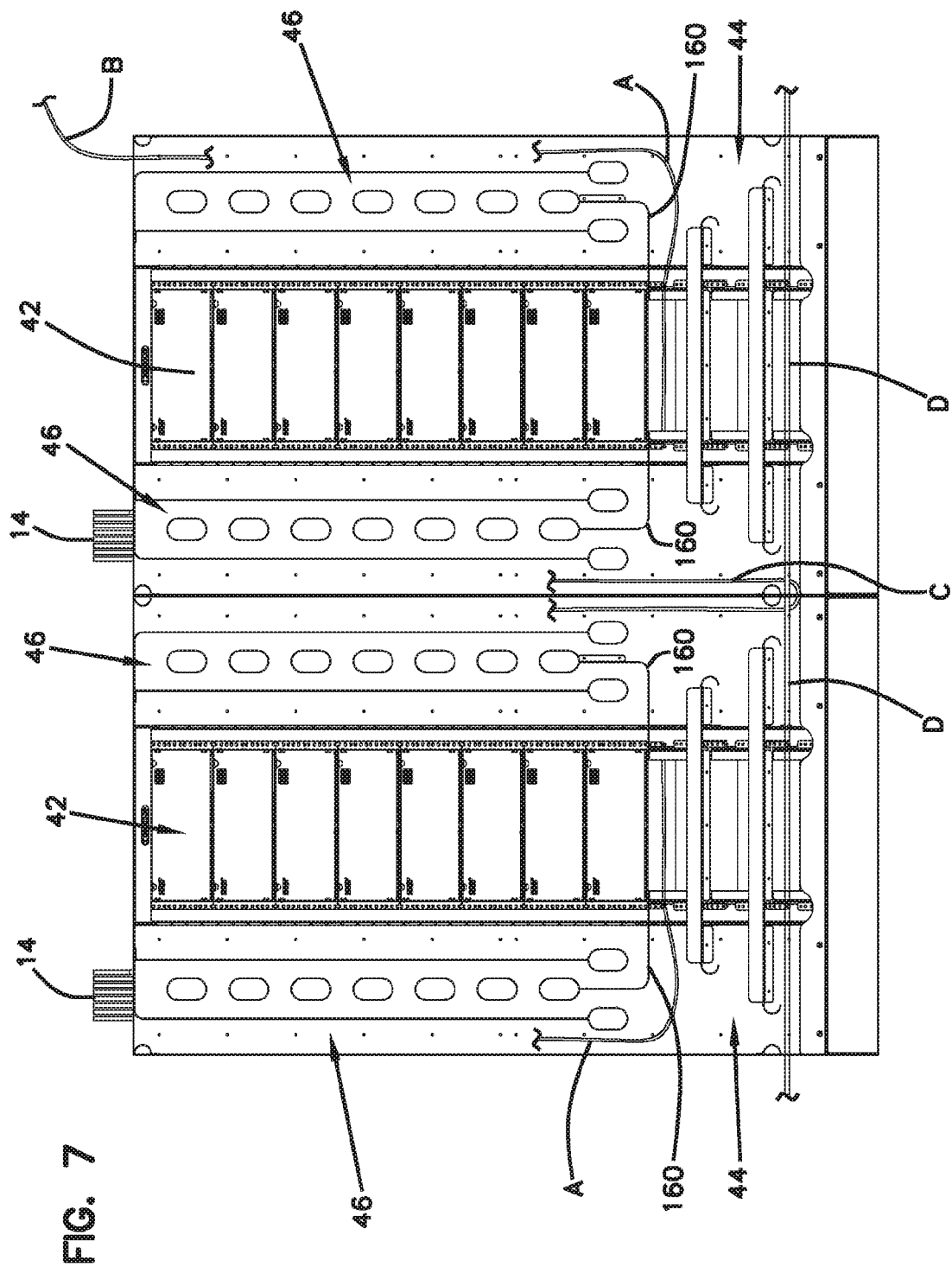
FIG. 7 is a front view of the telecommunications equipment frames of FIG. 6.
Figure 8:
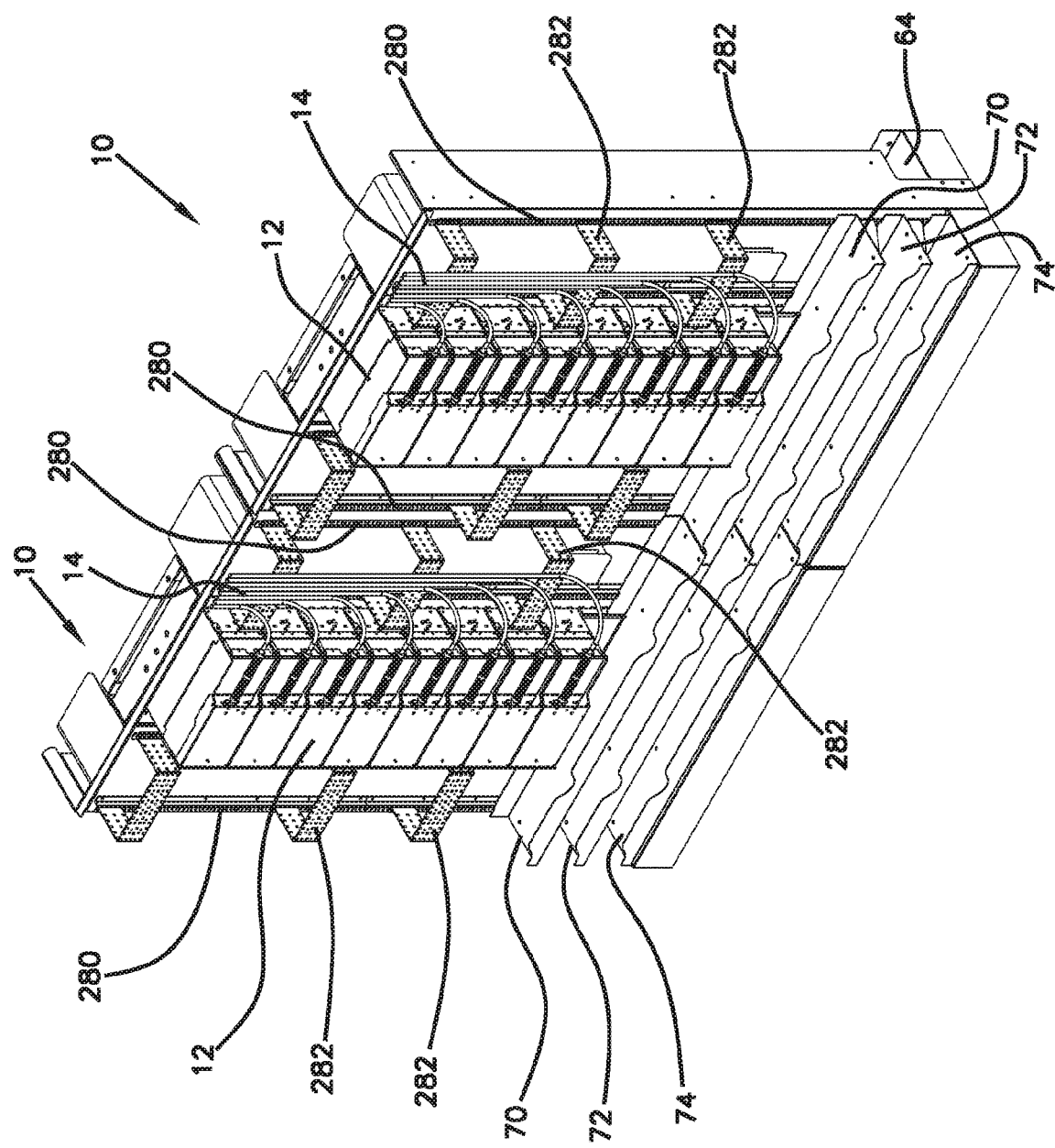
FIG. 8 is a rear perspective view of the telecommunications equipment frames of FIG. 6.
Figure 9A:
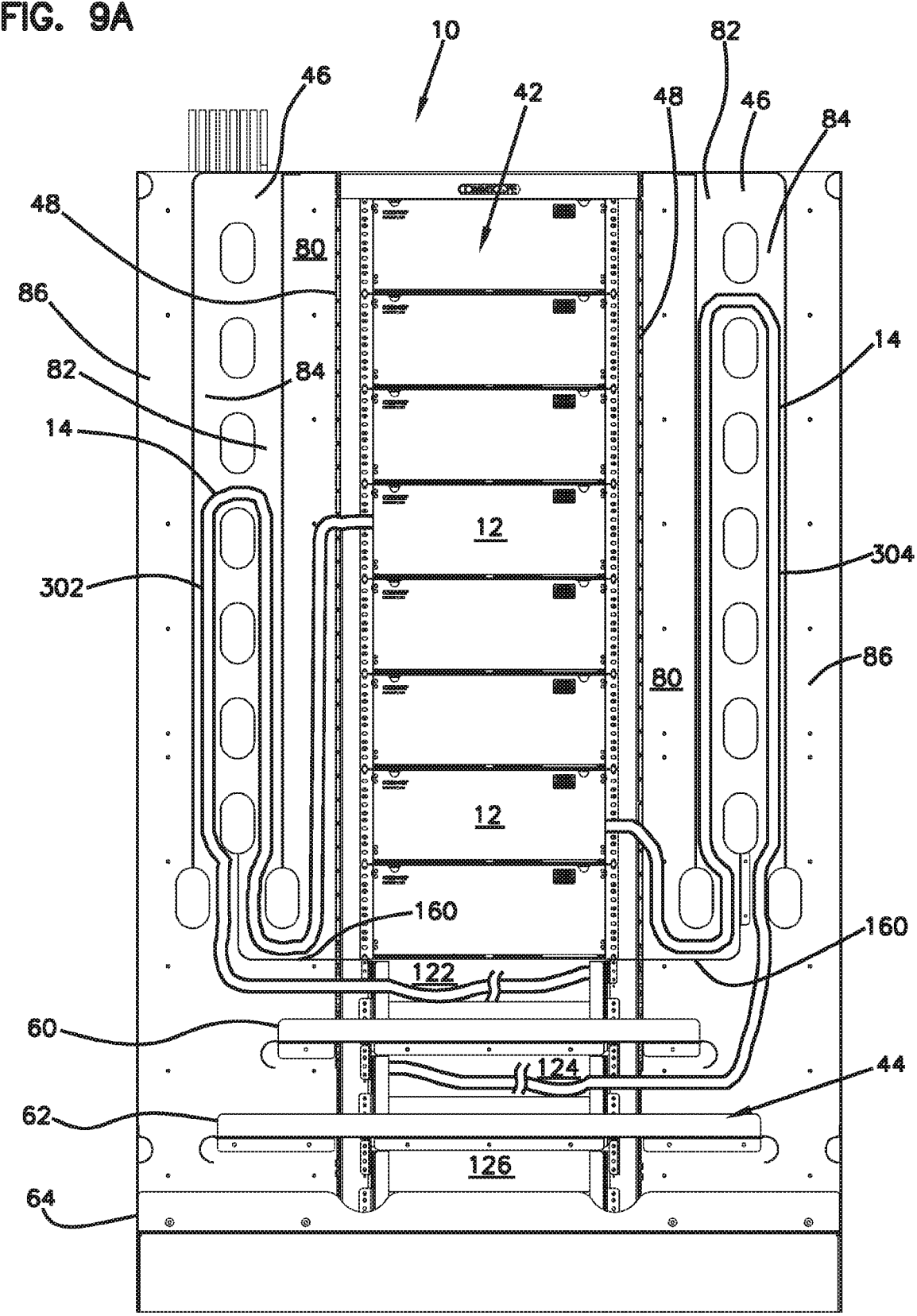
FIGS. 9A-E show various cable routings associated with the patch cords of the telecommunications equipment frame of FIGS. 1-8.
Figure 9B:
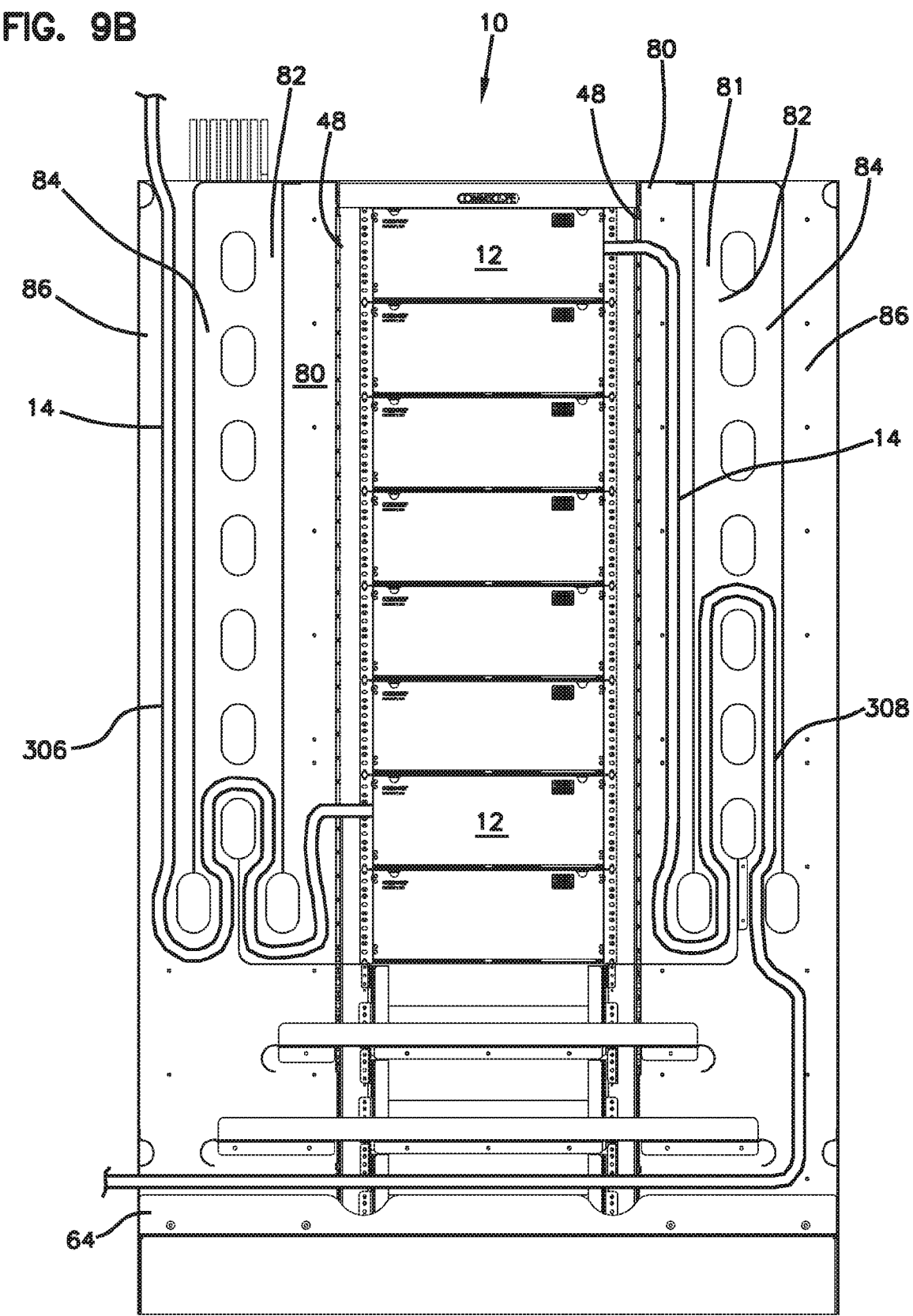
Figure 9C:
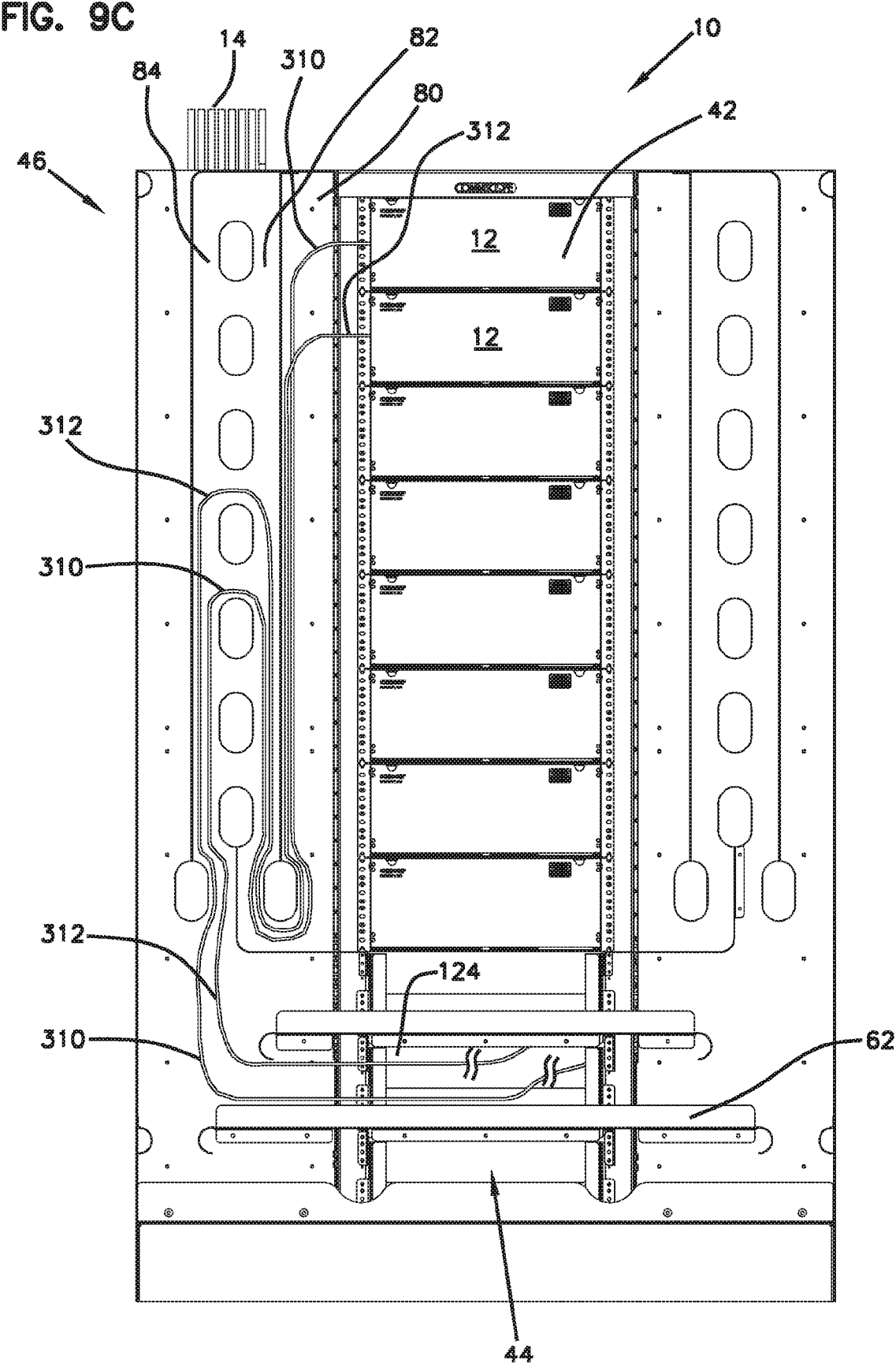
Figure 9D:
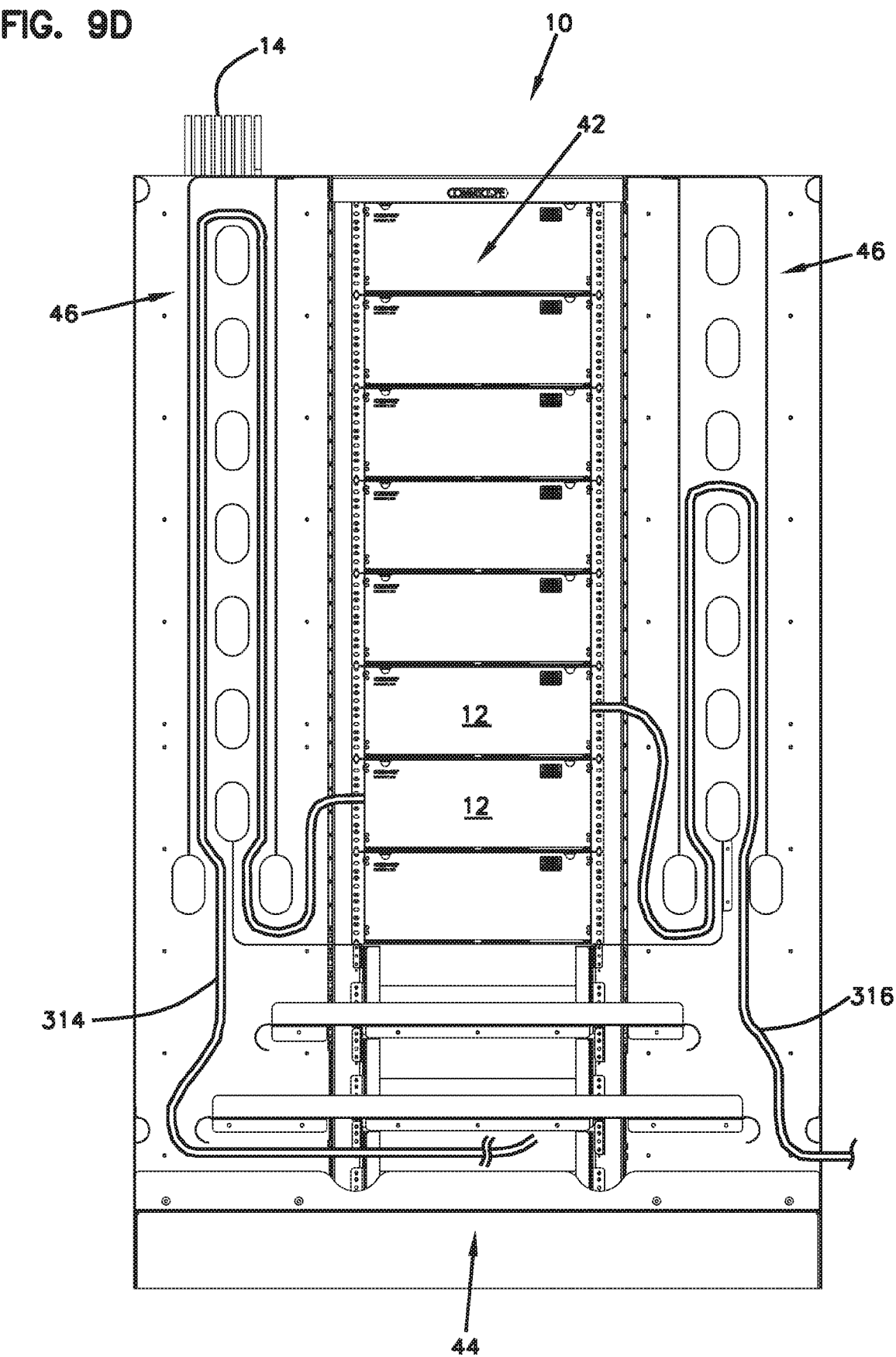
Figure 9E:
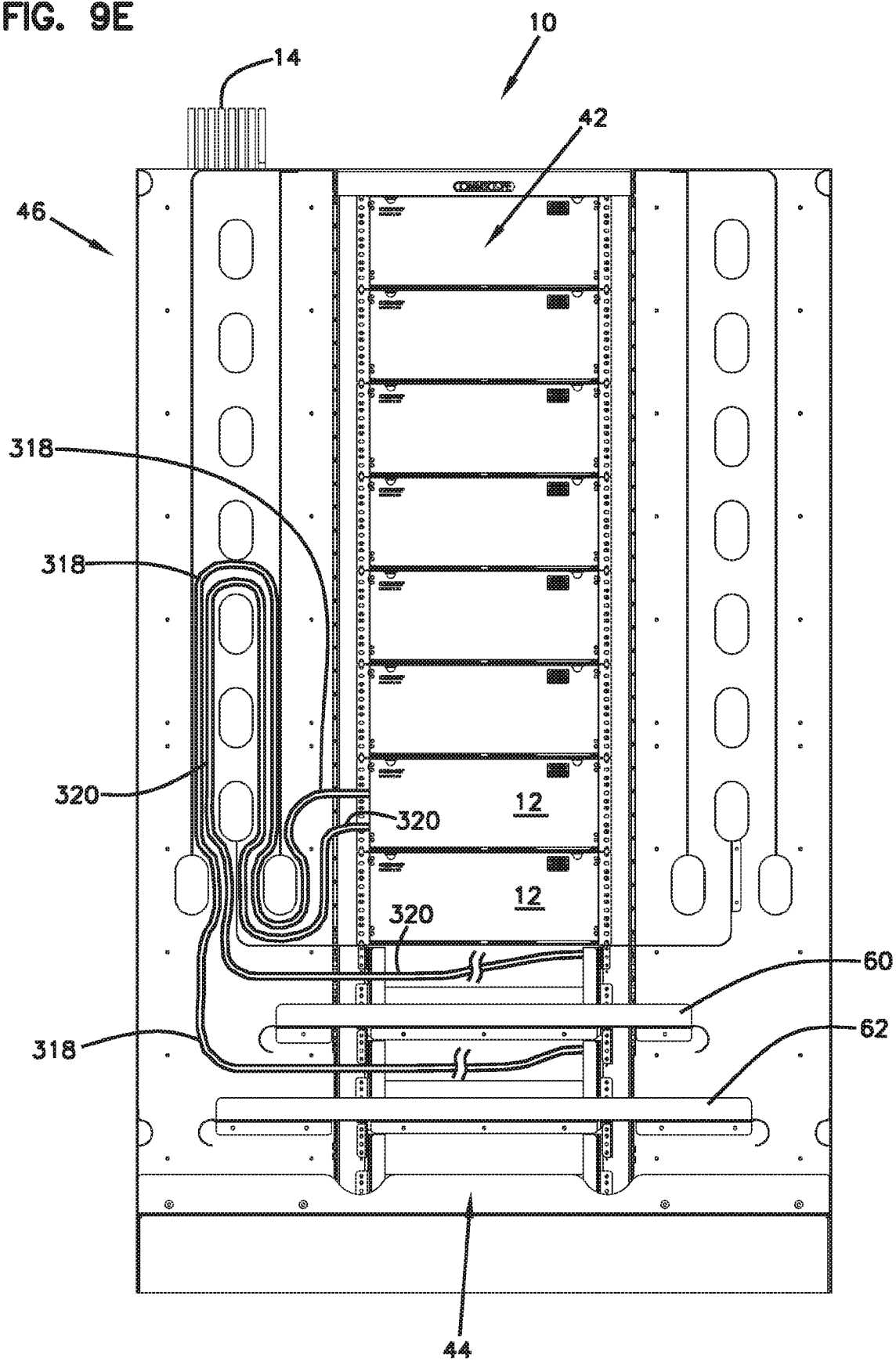
Figure 10:
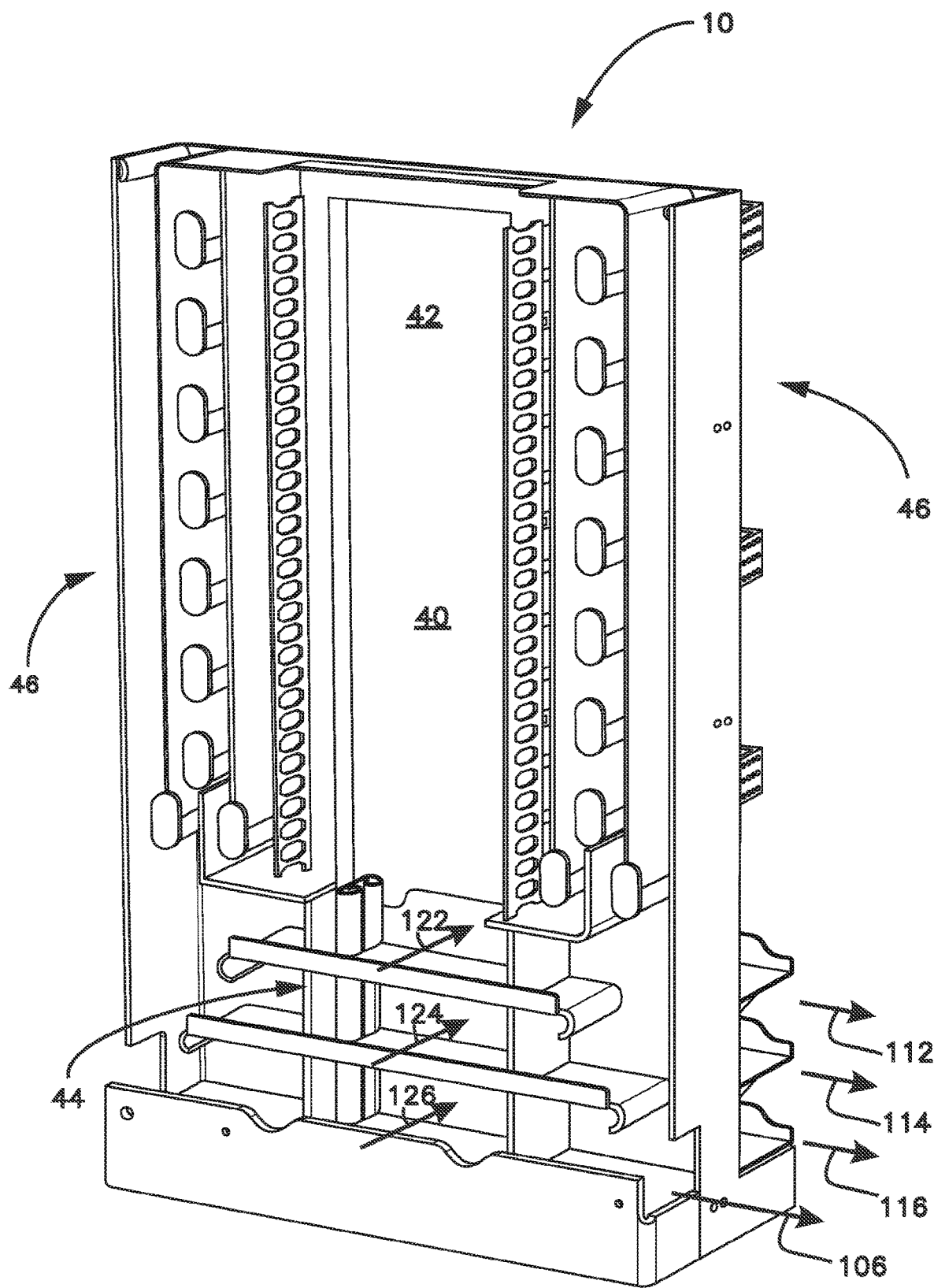
FIG. 10 is a front perspective view of the telecommunications equipment frame of FIG. 1, without any equipment.
Figure 11:
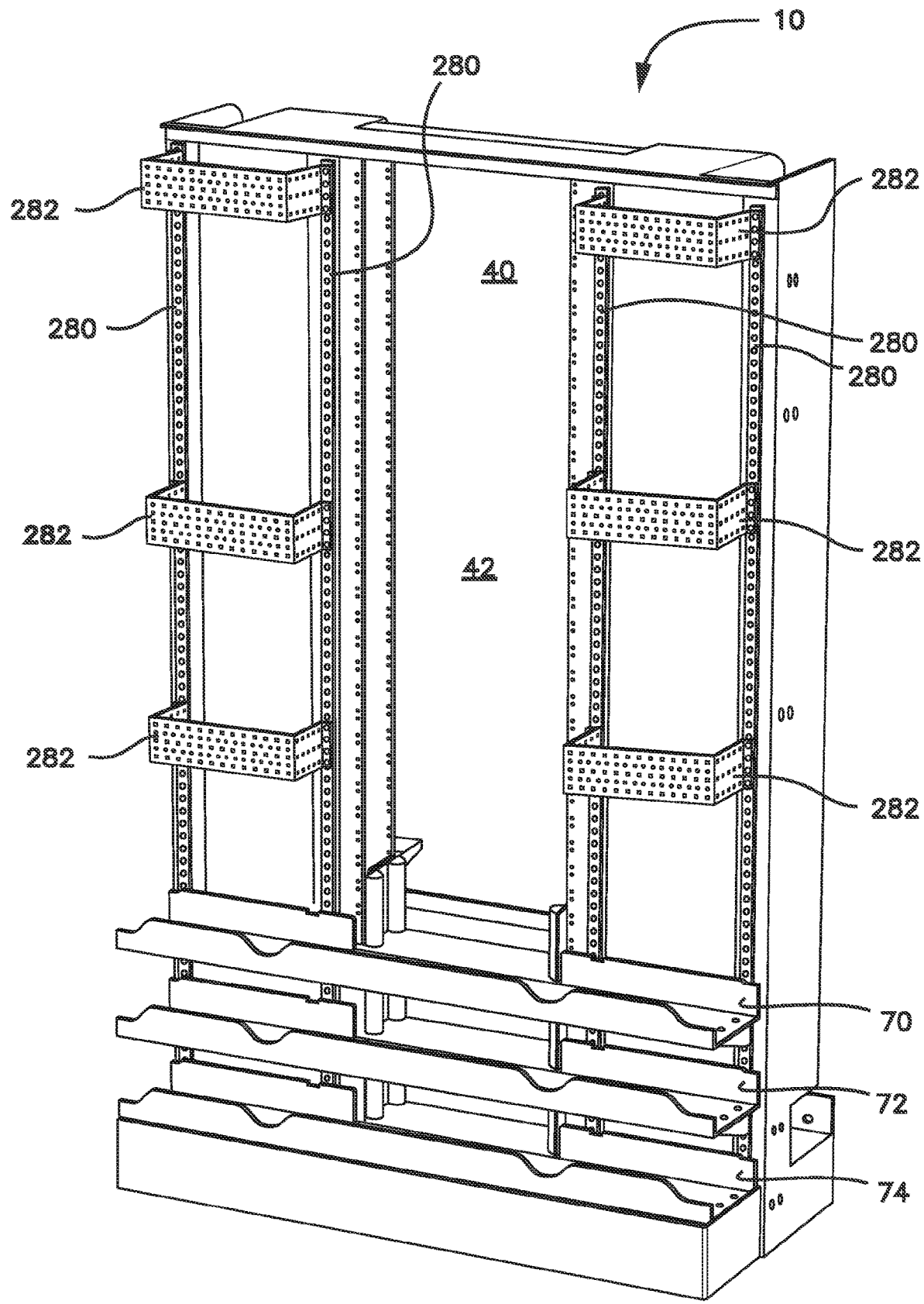
FIG. 11 is a rear perspective view of the frame of FIG. 10.
Figure 12:
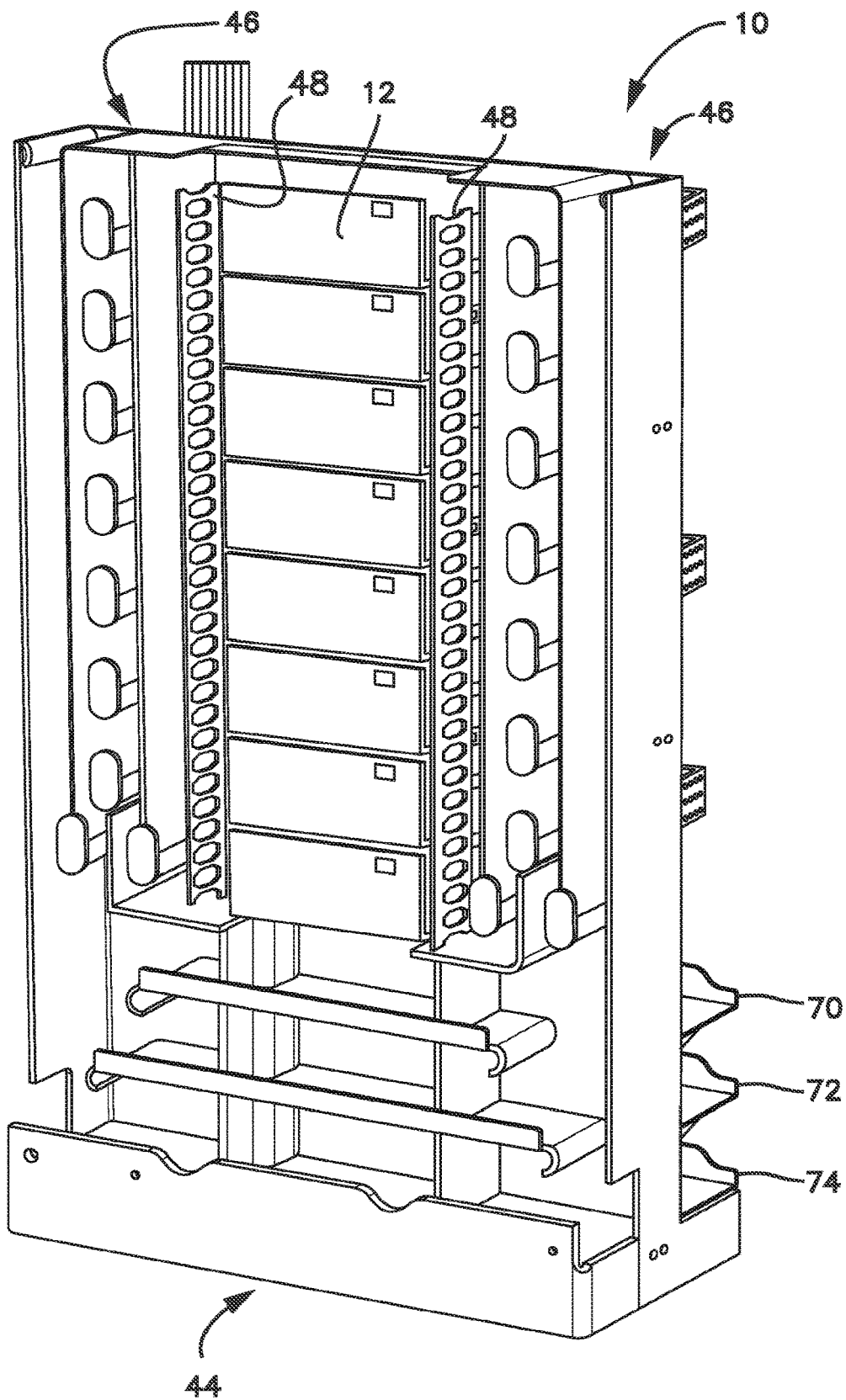
FIG. 12 is a front perspective view of the frame of FIG. 10 including telecommunications equipment.
Figure 13:
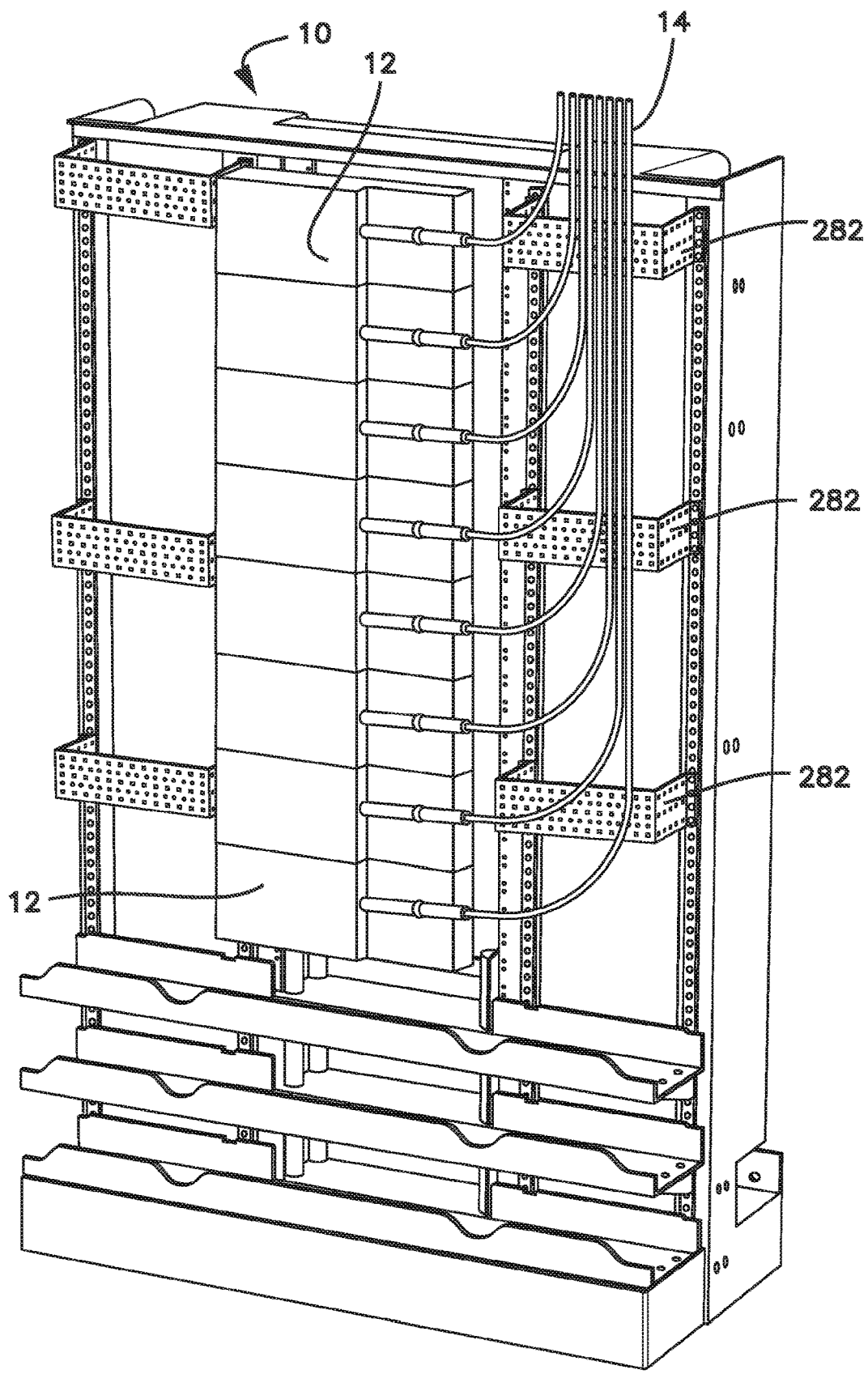
FIG. 13 is a rear perspective view of the frame of FIG. 12.
Figure 14:
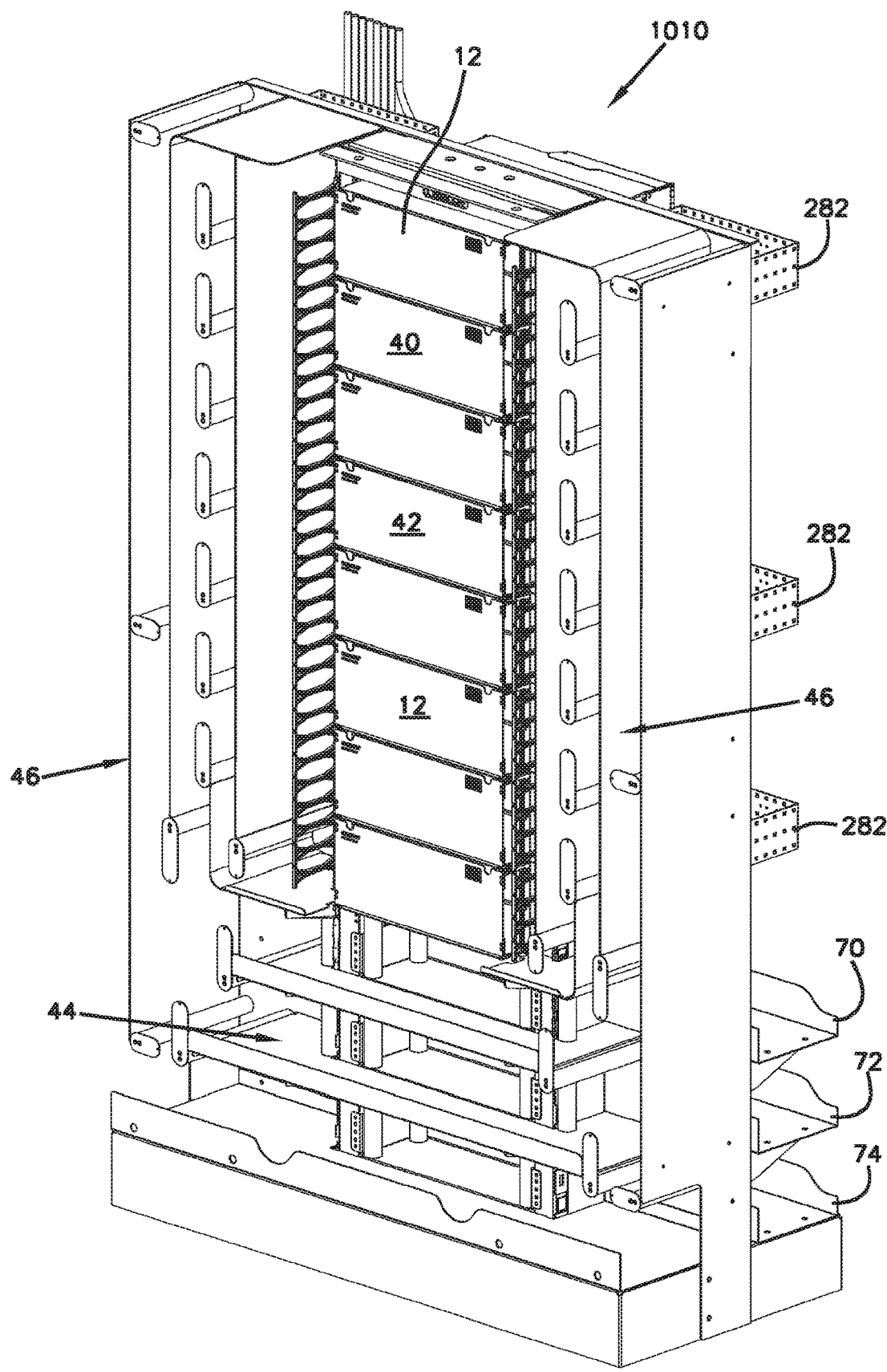
FIG. 14 is a front perspective view of a second embodiment of a telecommunications frame including telecommunications equipment.
Figure 15:
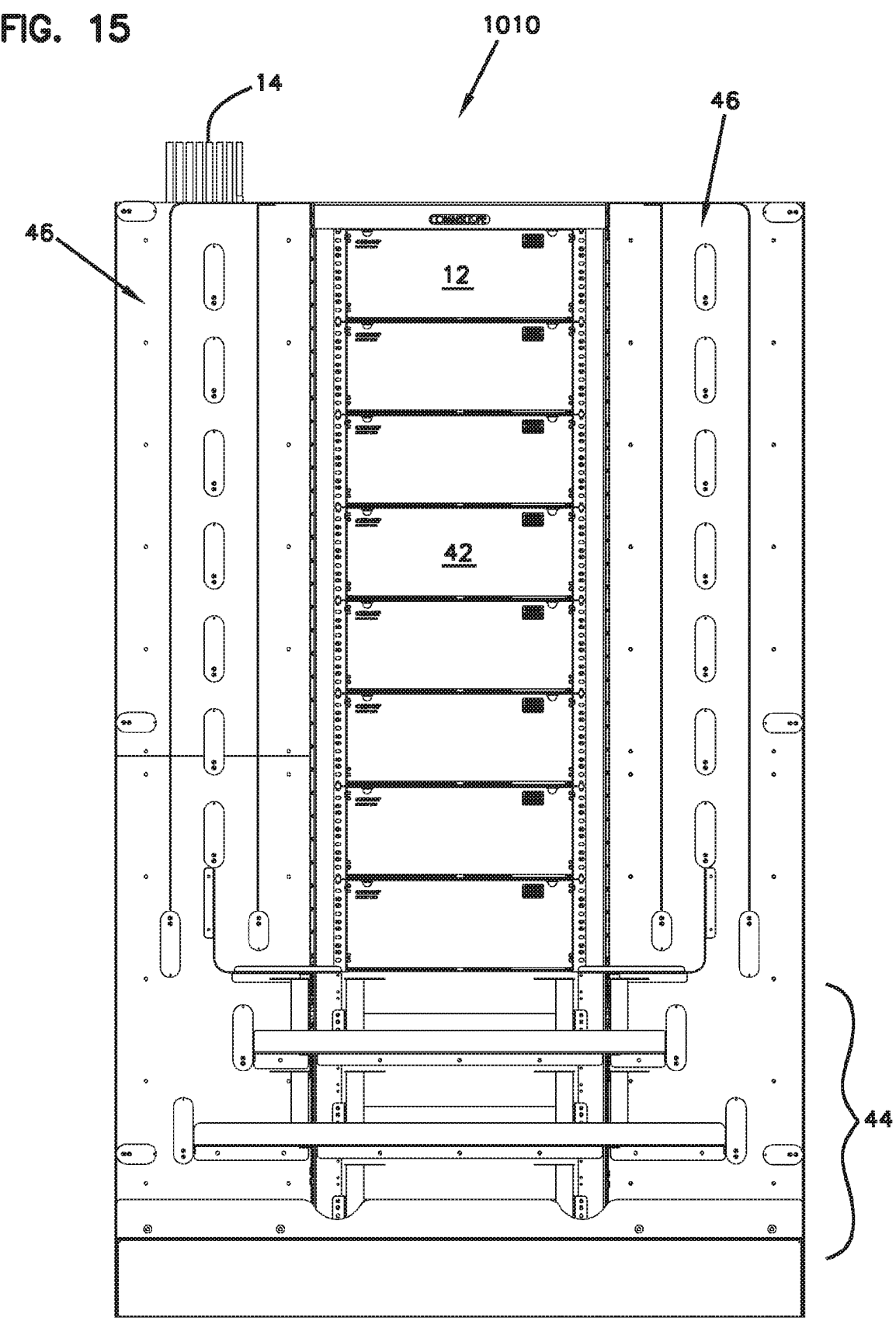
FIG. 15 is a front view of the telecommunications equipment frame of FIG. 14.
Figure 16:
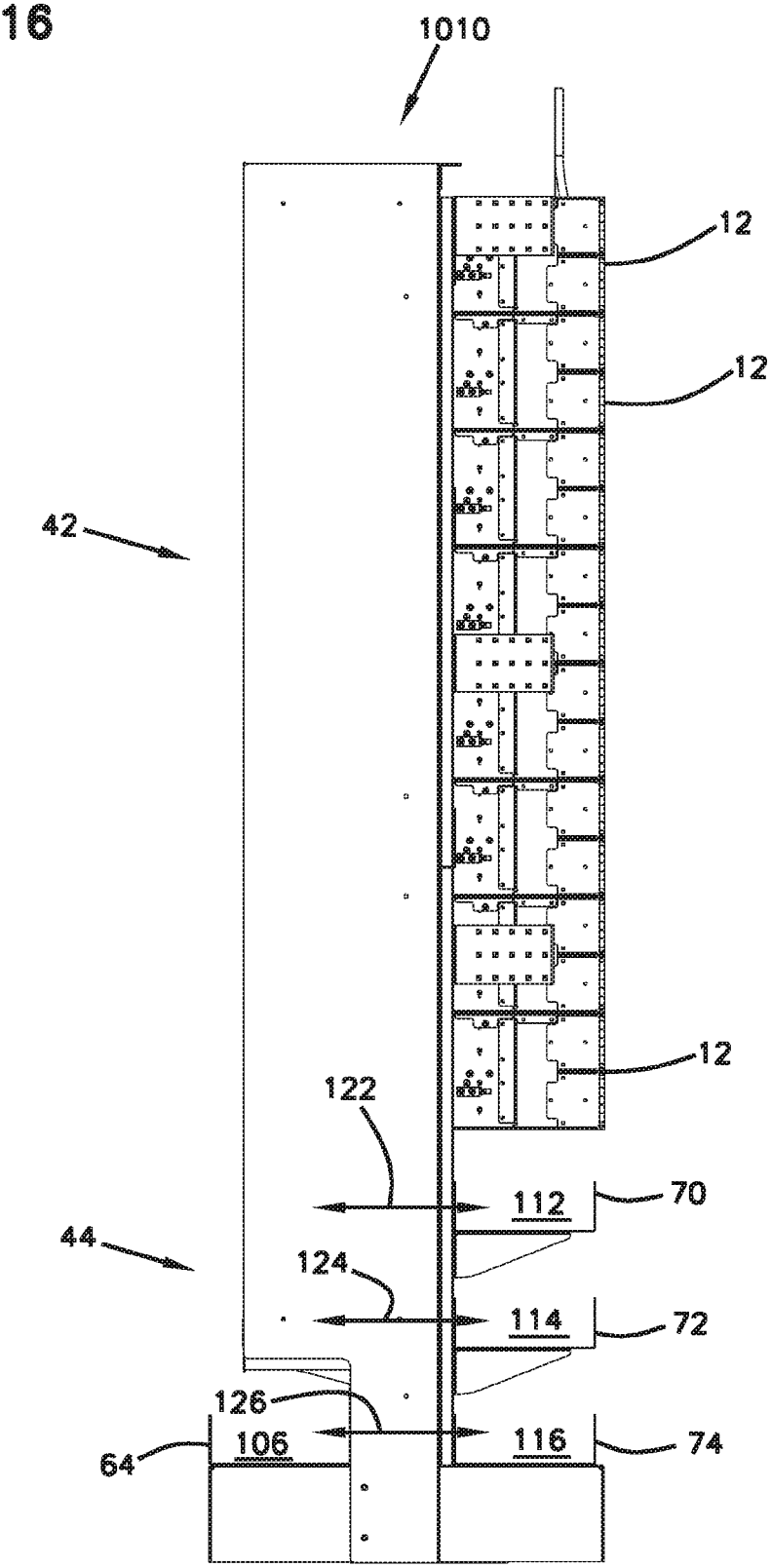
FIG. 16 is a side view of the telecommunications equipment frame of FIG. 14.
Figure 17:
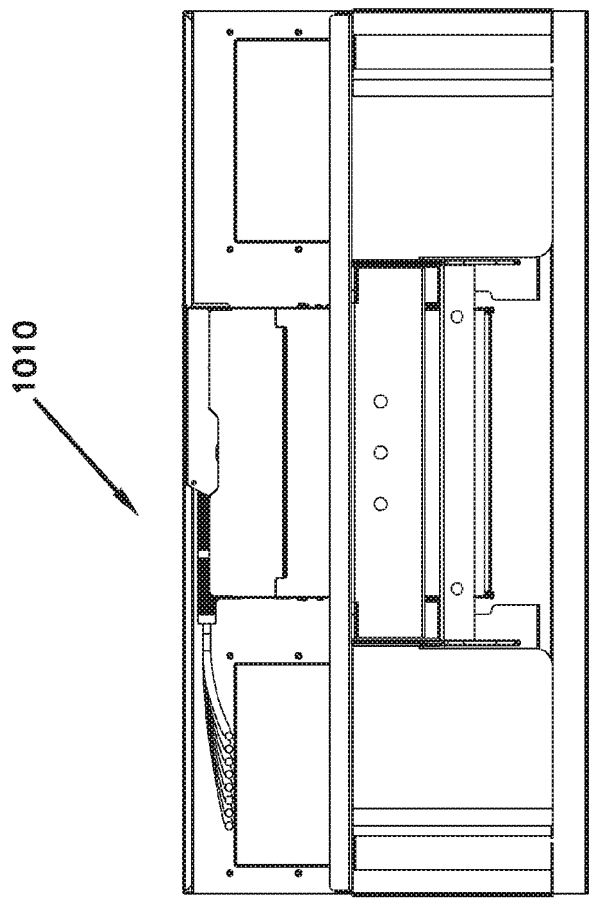
FIG. 17 is a top view of the telecommunications equipment frame of FIG. 14.
Figure 18:
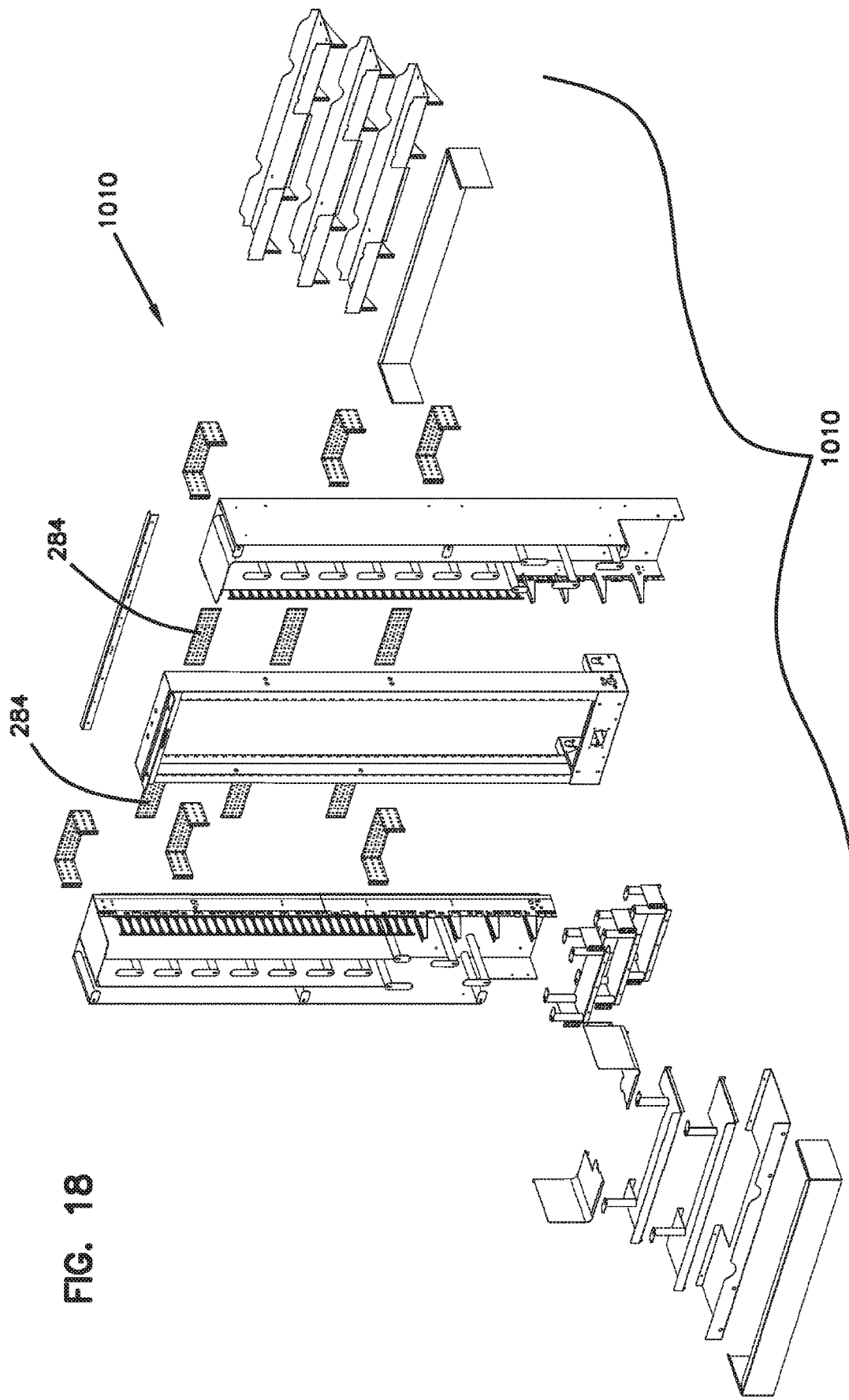
FIG. 18 is an exploded perspective view of the telecommunications equipment frame of FIG. 14, shown without the equipment.
Figure 19:
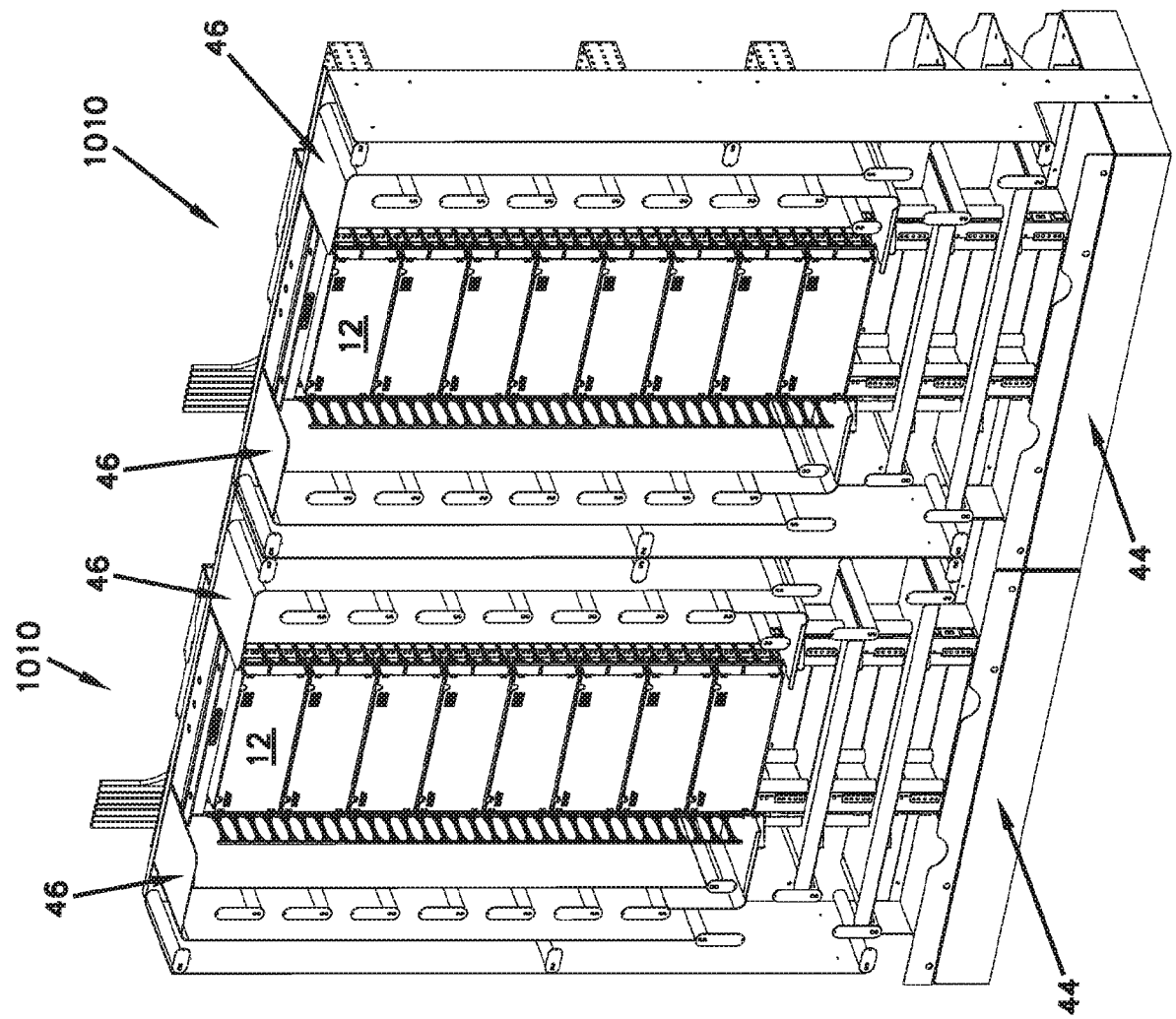
FIG. 19 is a front perspective view of two of the telecommunications equipment frames of FIG. 14 positioned side-by-side in a row.
Figure 20:
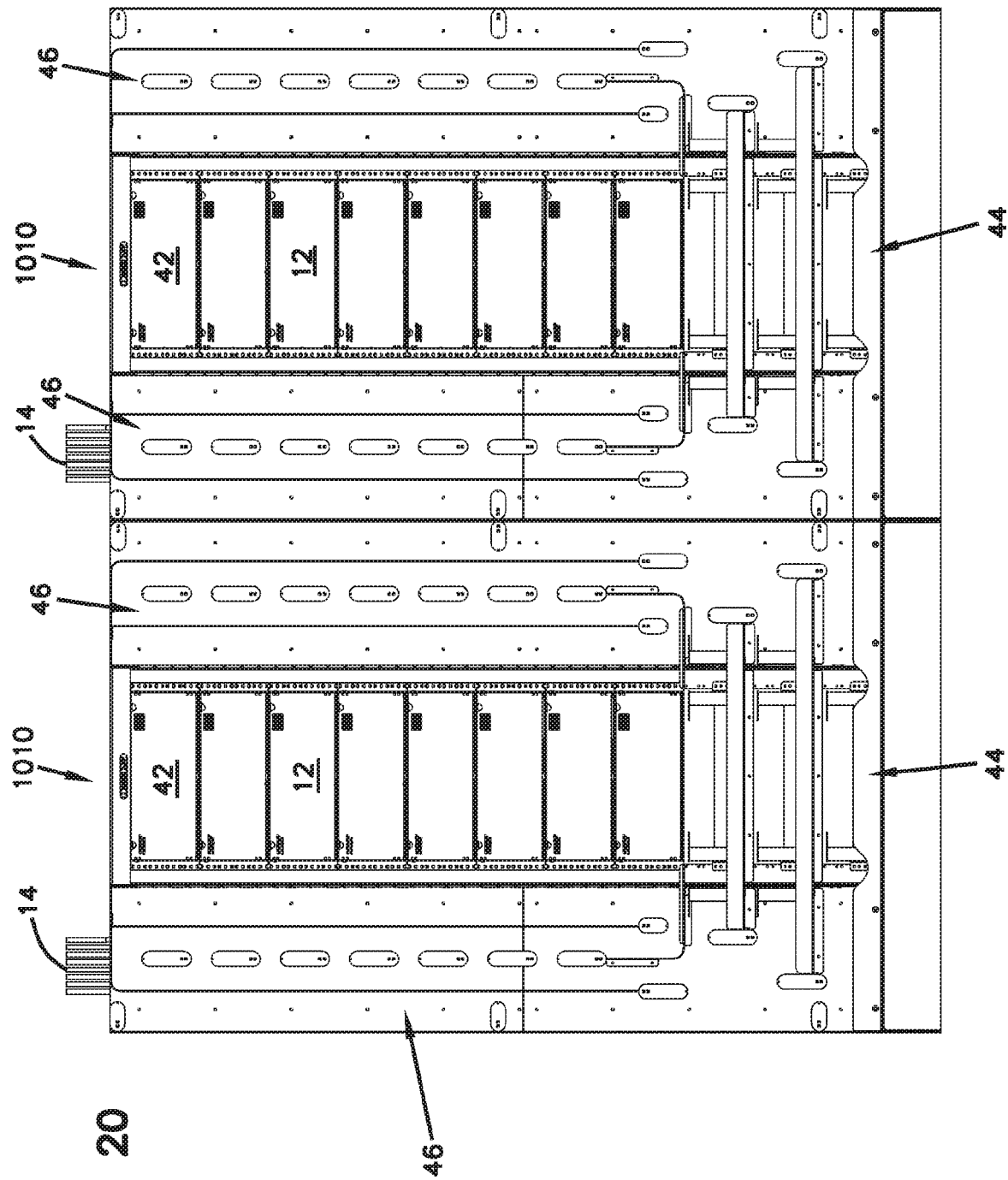
FIG. 20 is a front view of the telecommunications equipment frames of FIG. 19.
Figure 21:
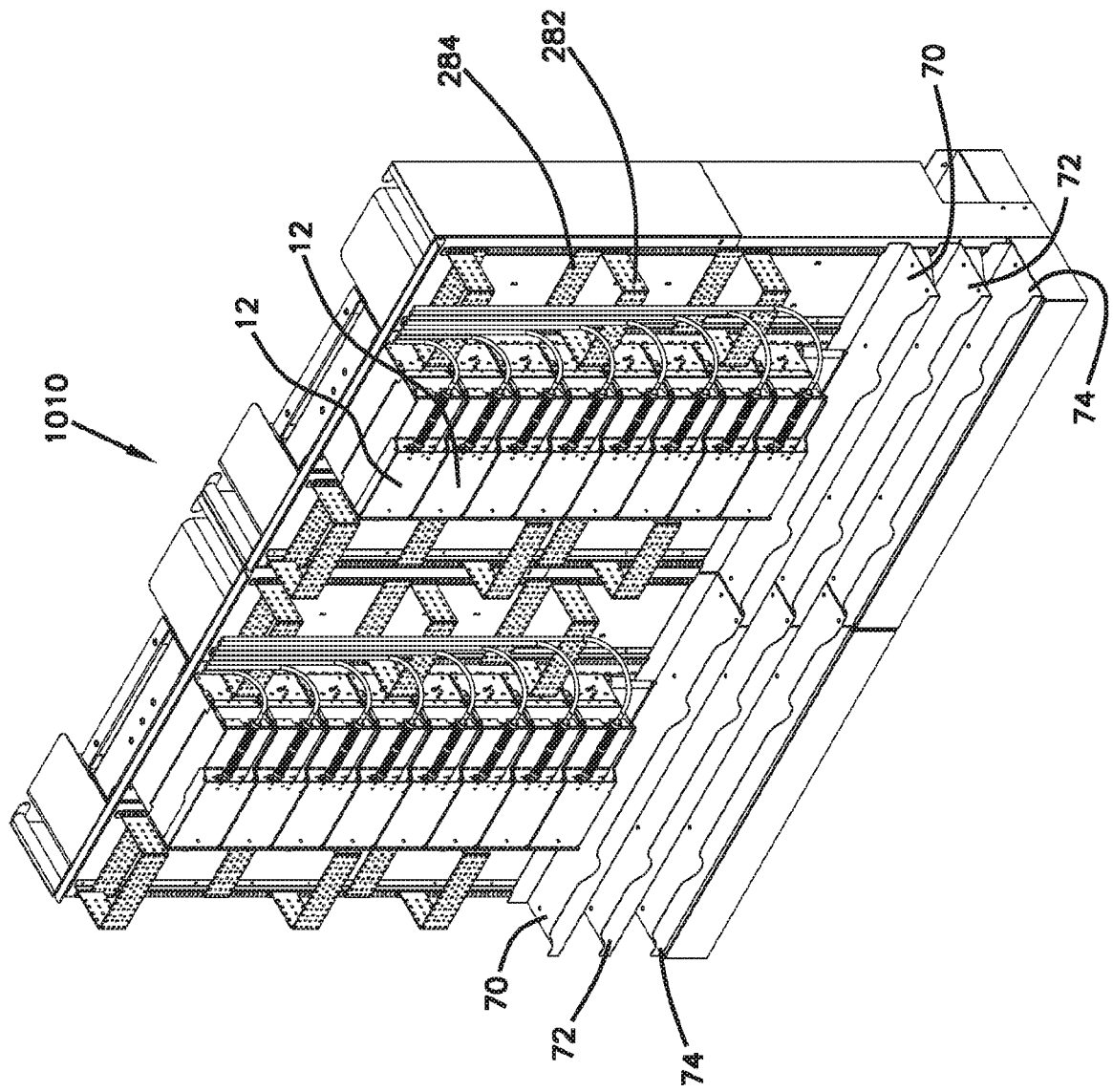
FIG. 21 is a rear perspective view of the telecommunications equipment frames of FIG. 19.
Figure 22:
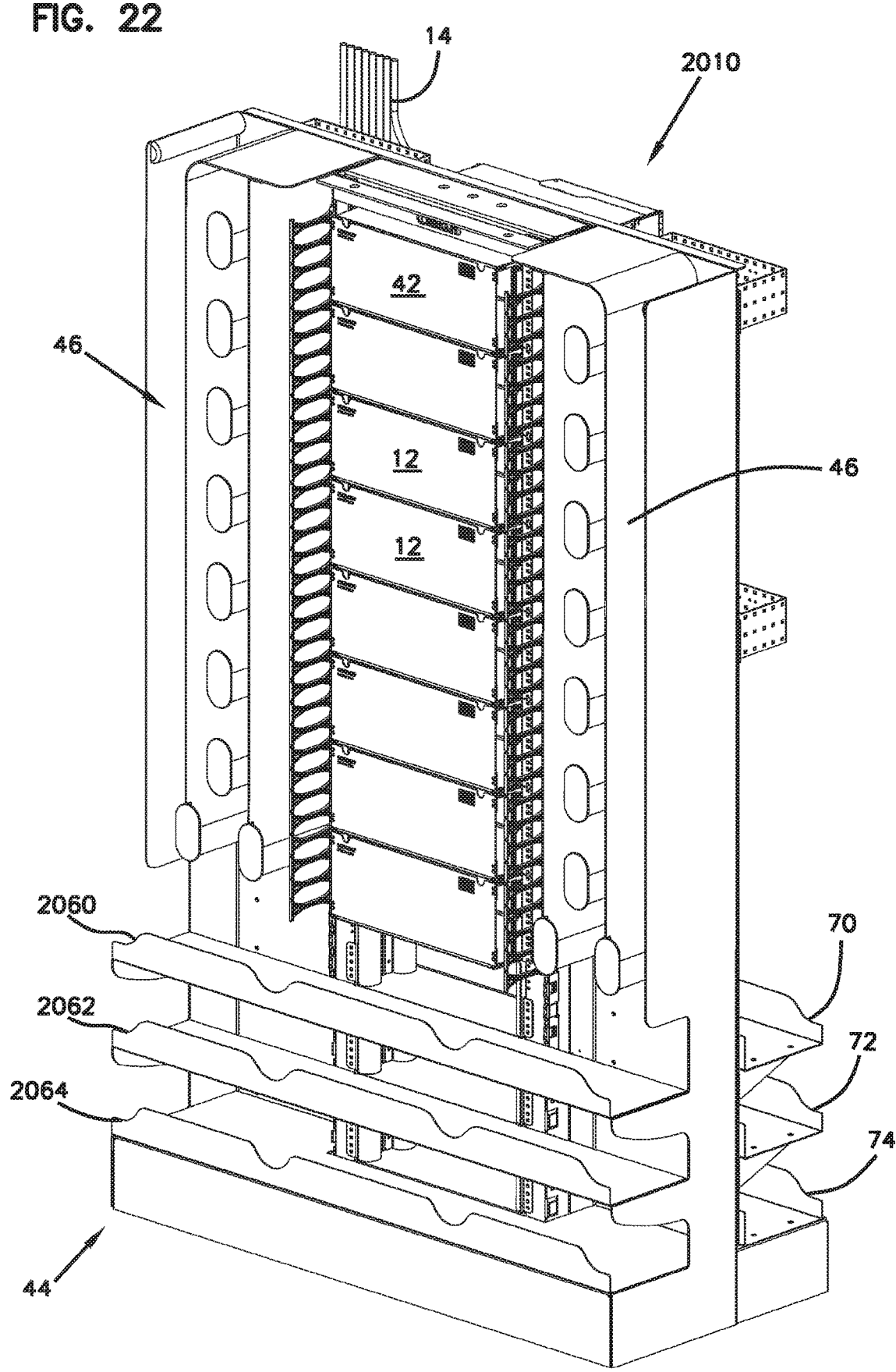
FIG. 22 is a front perspective view of a third embodiment of a telecommunications frame including telecommunications equipment.
Figure 23:
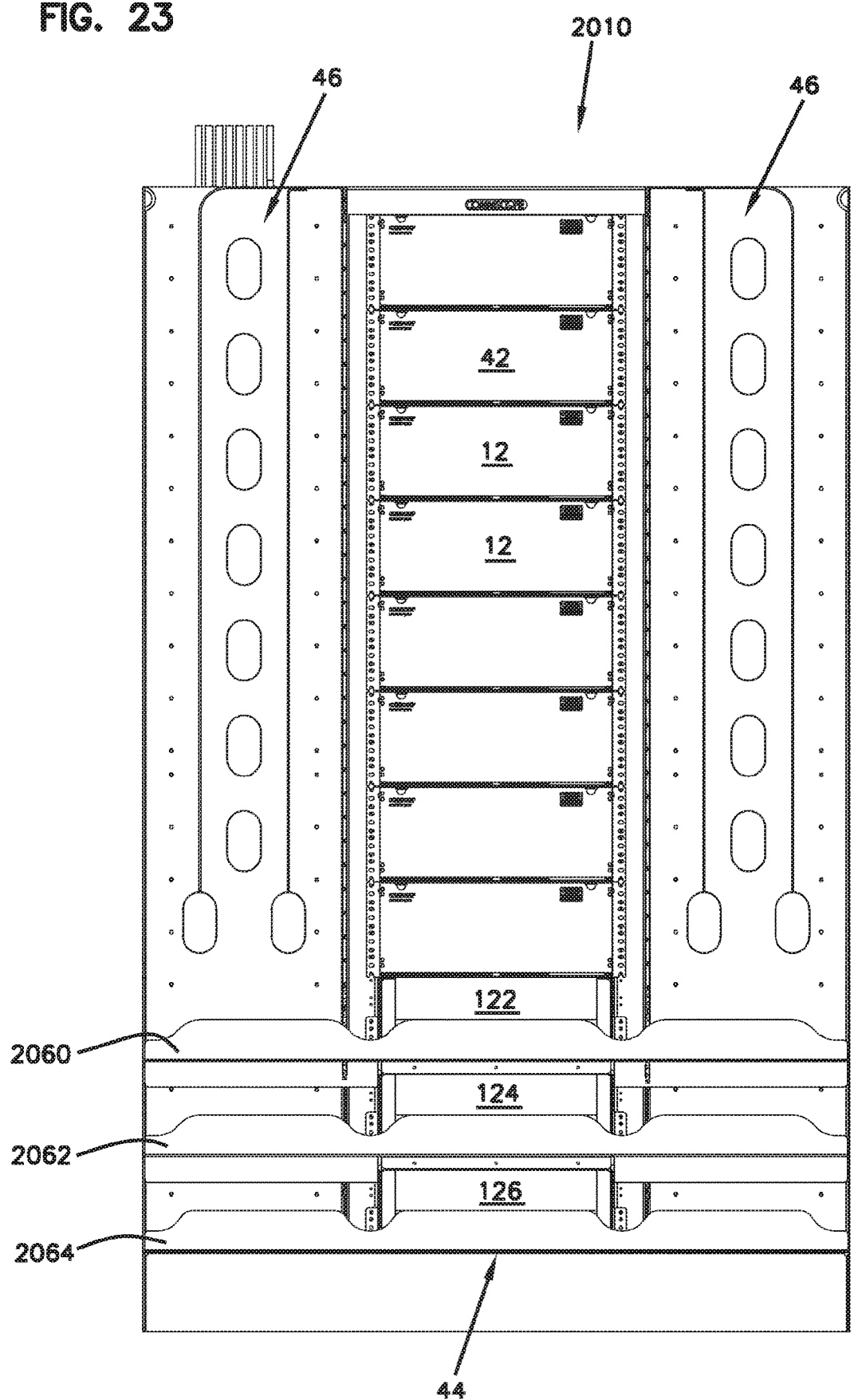
FIG. 23 is a front view of the telecommunications equipment frame of FIG. 22.
Figure 24:
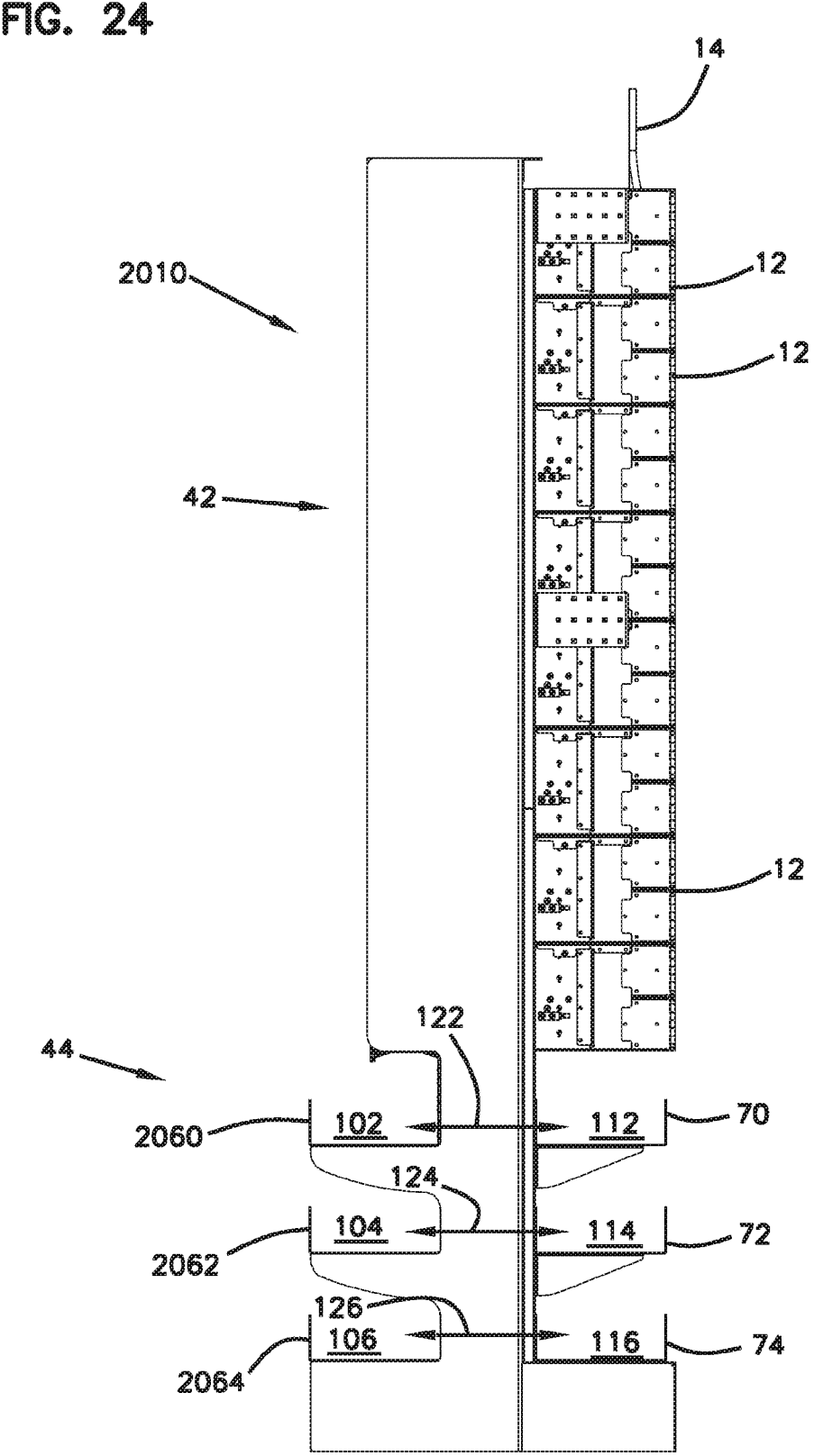
FIG. 24 is a side view of the telecommunications equipment frame of FIG. 22.
Figure 25:
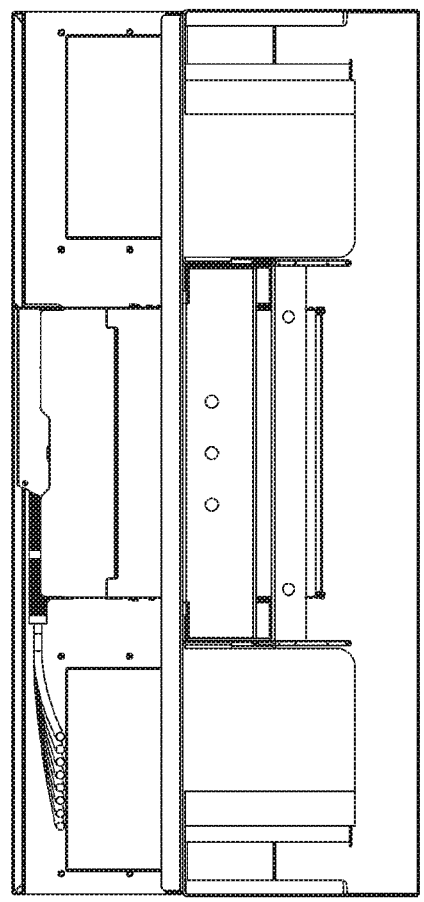
FIG. 25 is a top view of the telecommunications equipment frame of FIG. 22.
Figure 26:
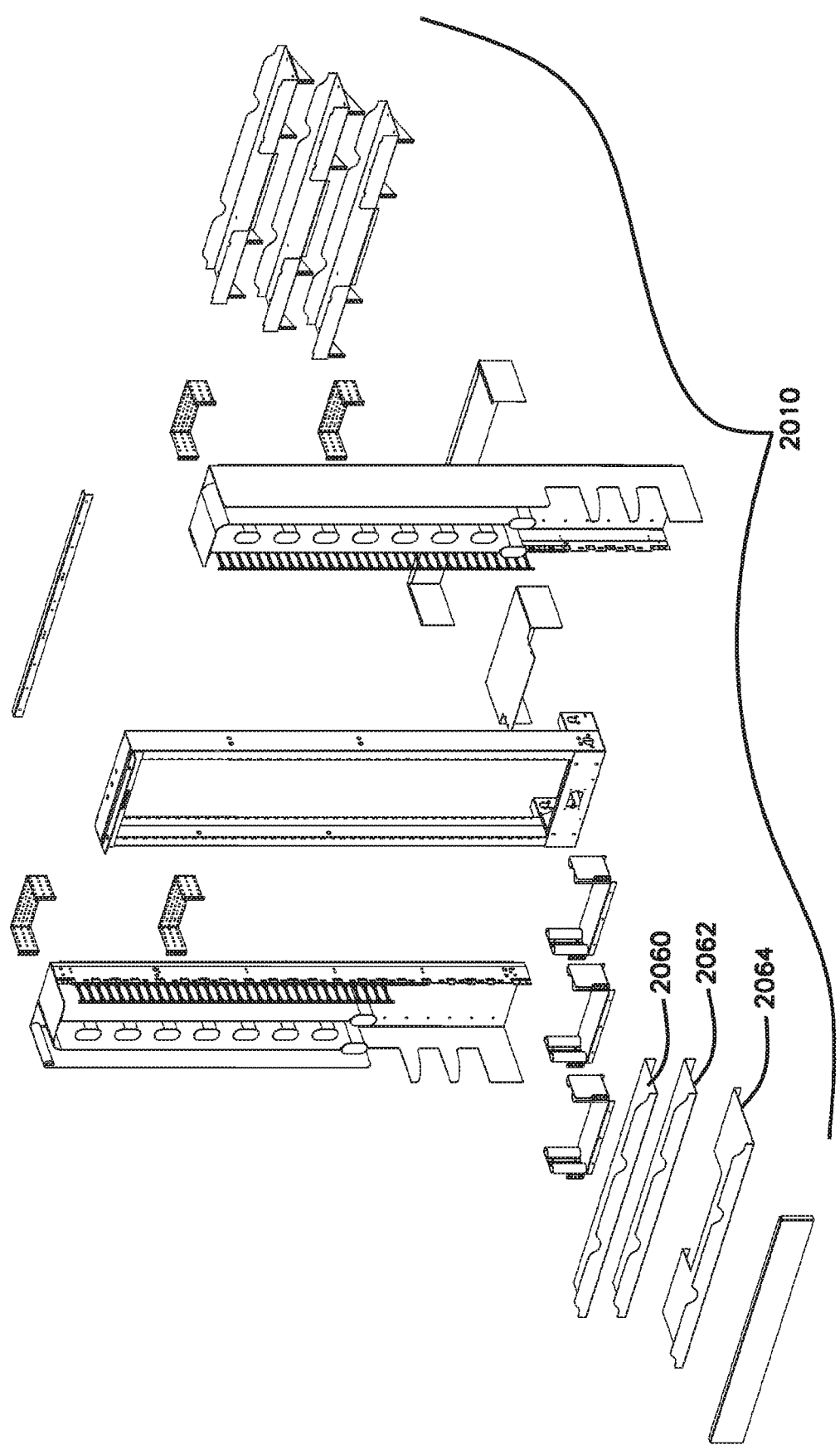
FIG. 26 is an exploded perspective view of the telecommunications equipment frame of FIG. 22, shown without the equipment.
Figure 27:
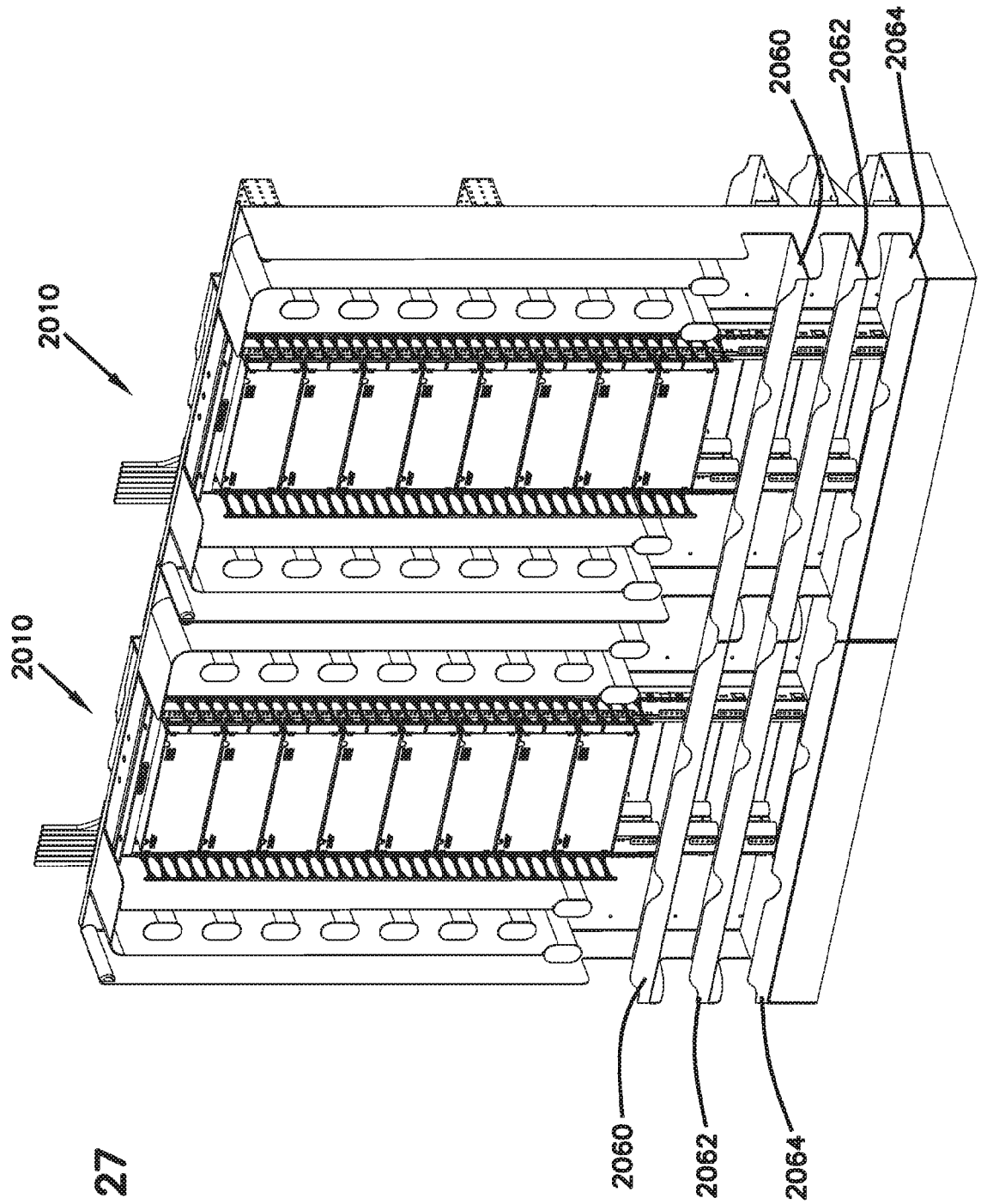
FIG. 27 is a front perspective view of two of the telecommunications equipment frames of FIG. 22 positioned side-by-side in a row.
Figure 28:
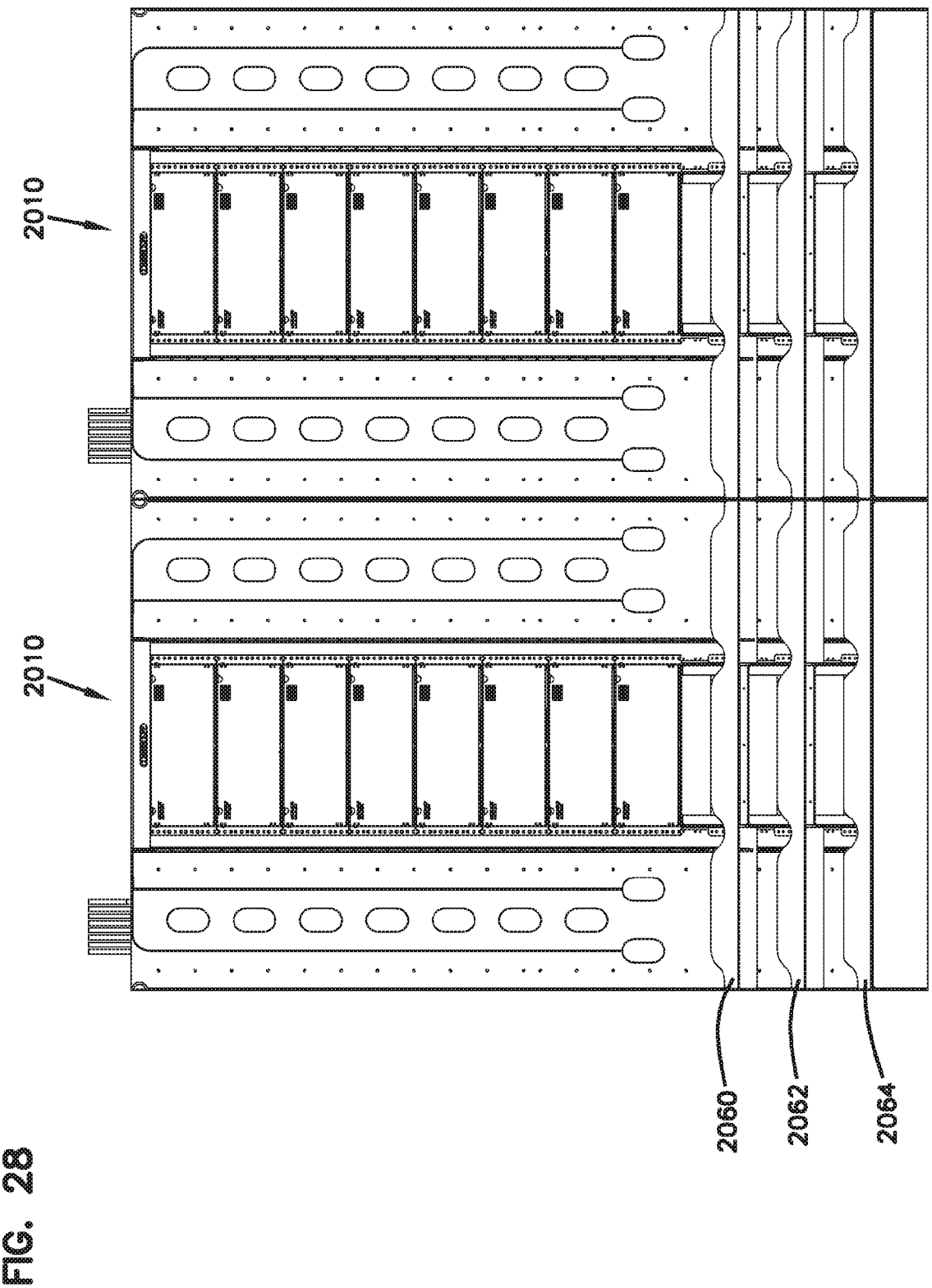
FIG. 28 is a front view of the telecommunications equipment frames of FIG. 27.
Figure 29:
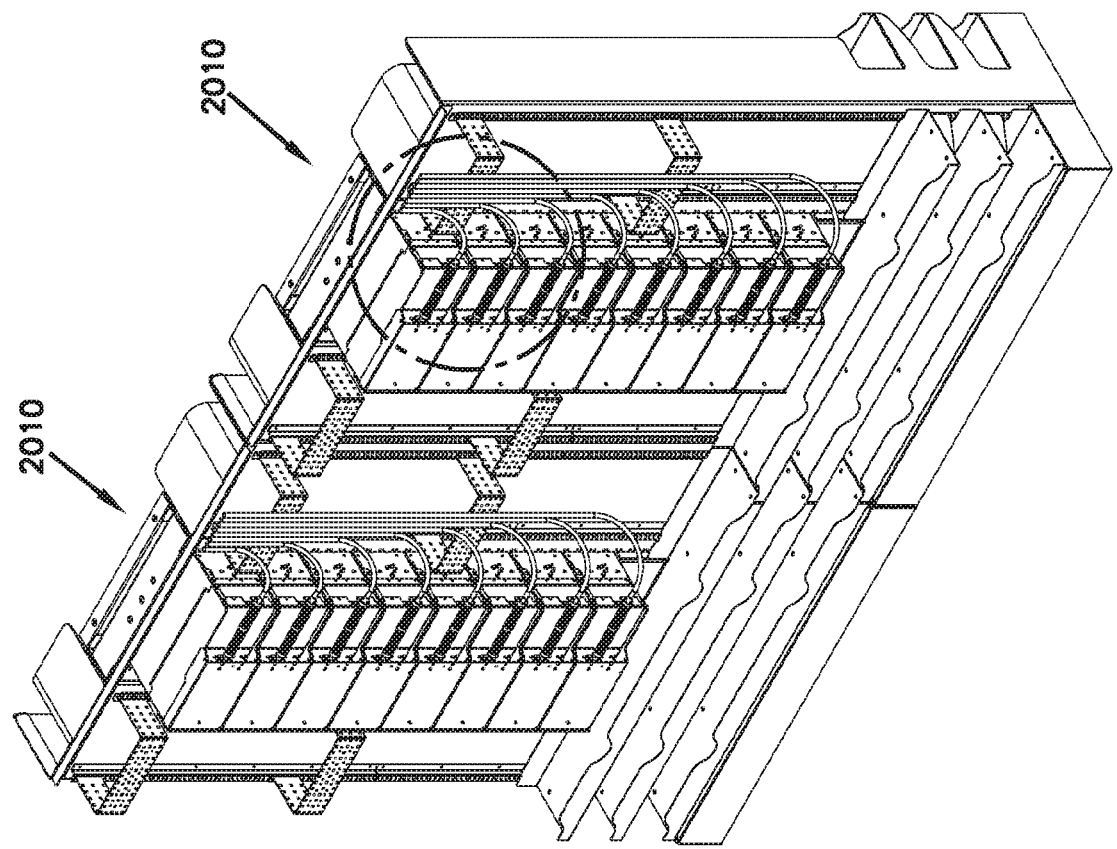
FIG. 29 is a rear perspective view of the telecommunications equipment frames of FIG. 27.
Figure 30:
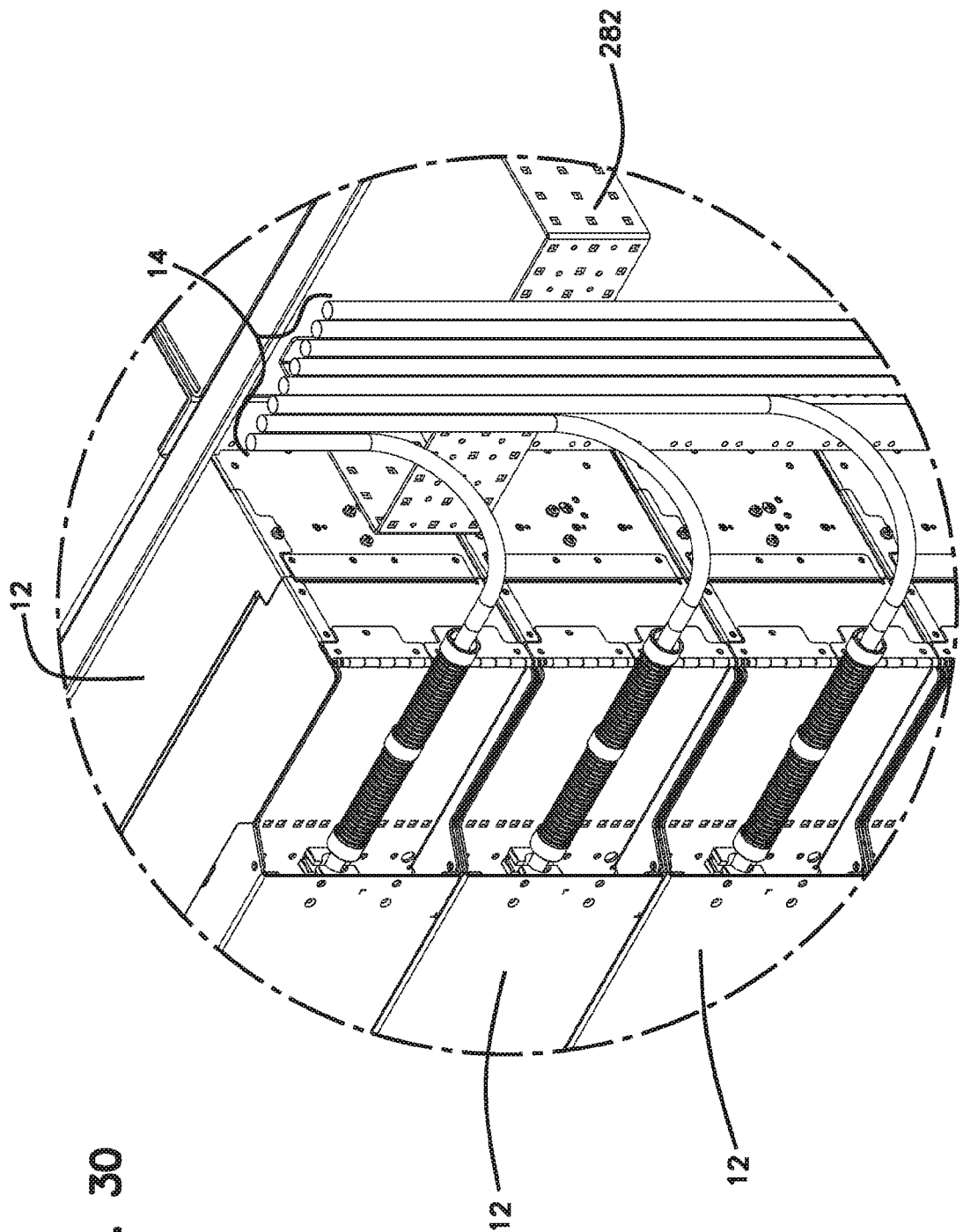
FIG. 30 is an enlarged view of a portion of the incoming and outgoing cables and the telecommunications equipment in a rear perspective view.
Figure 31:
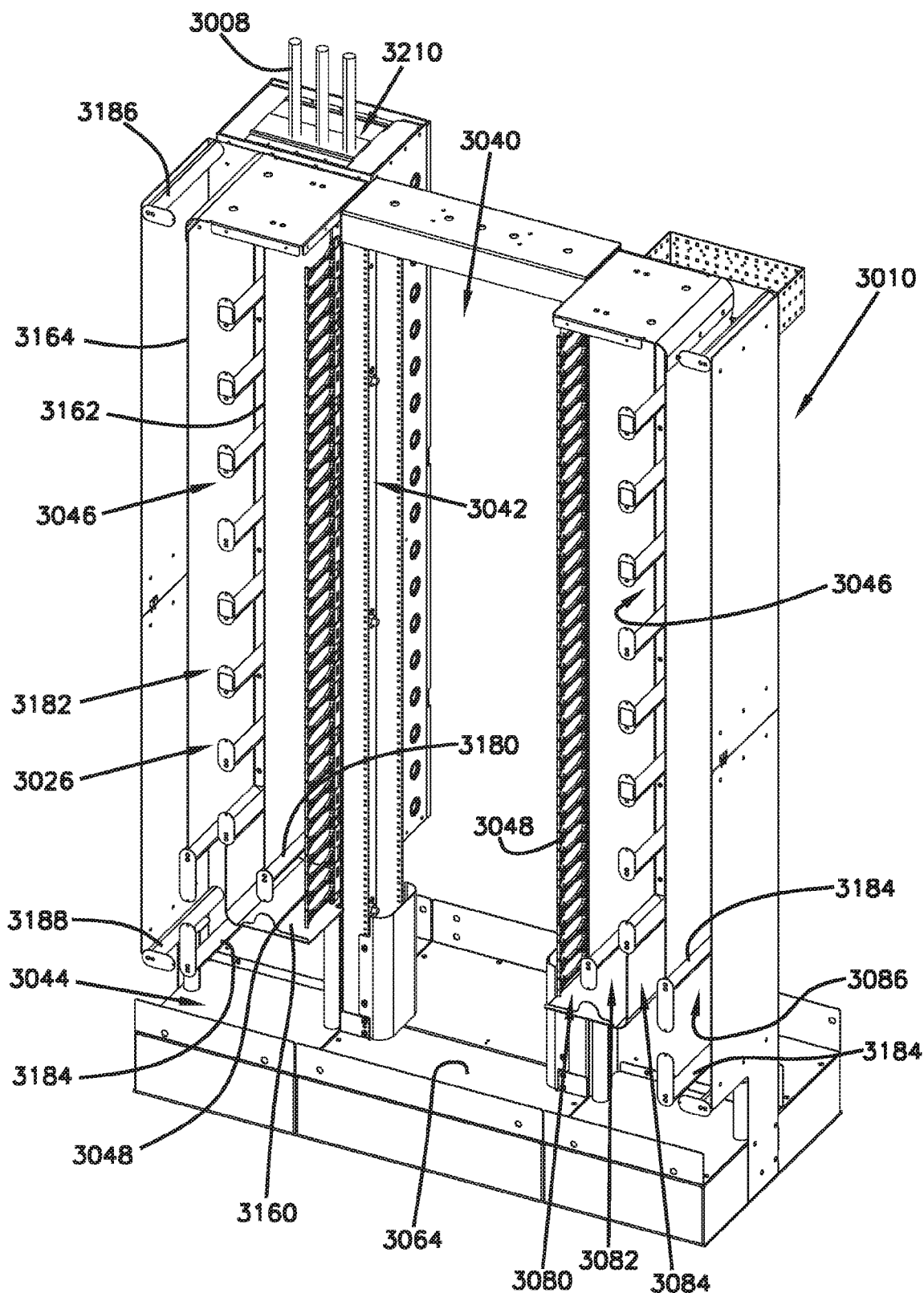
FIG. 31 is a front perspective view of another embodiment of a telecommunications equipment frame configured to hold telecommunications equipment.
Figure 32:
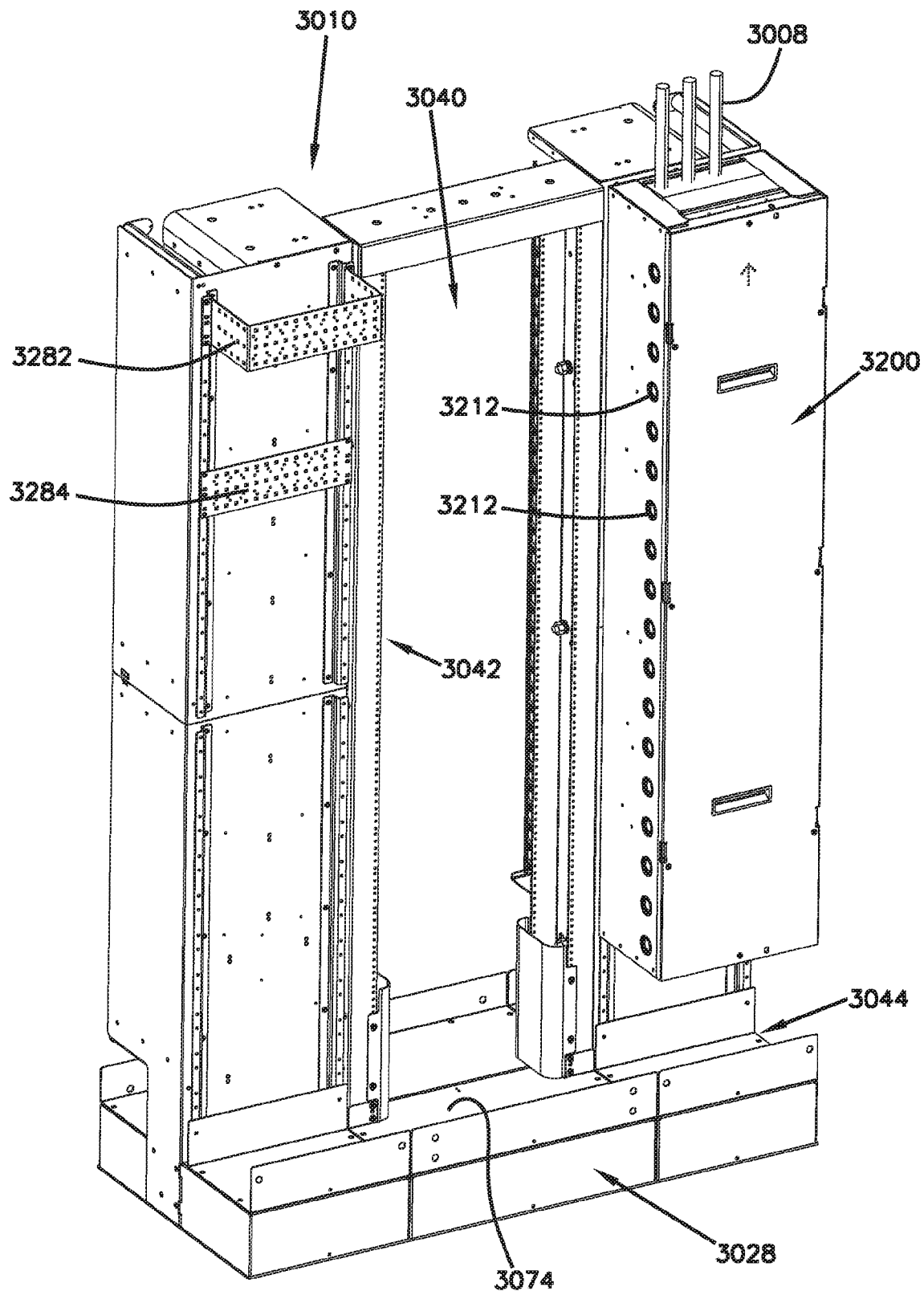
FIG. 32 is a rear perspective view of the telecommunications equipment frame of FIG. 31.
Figure 33:
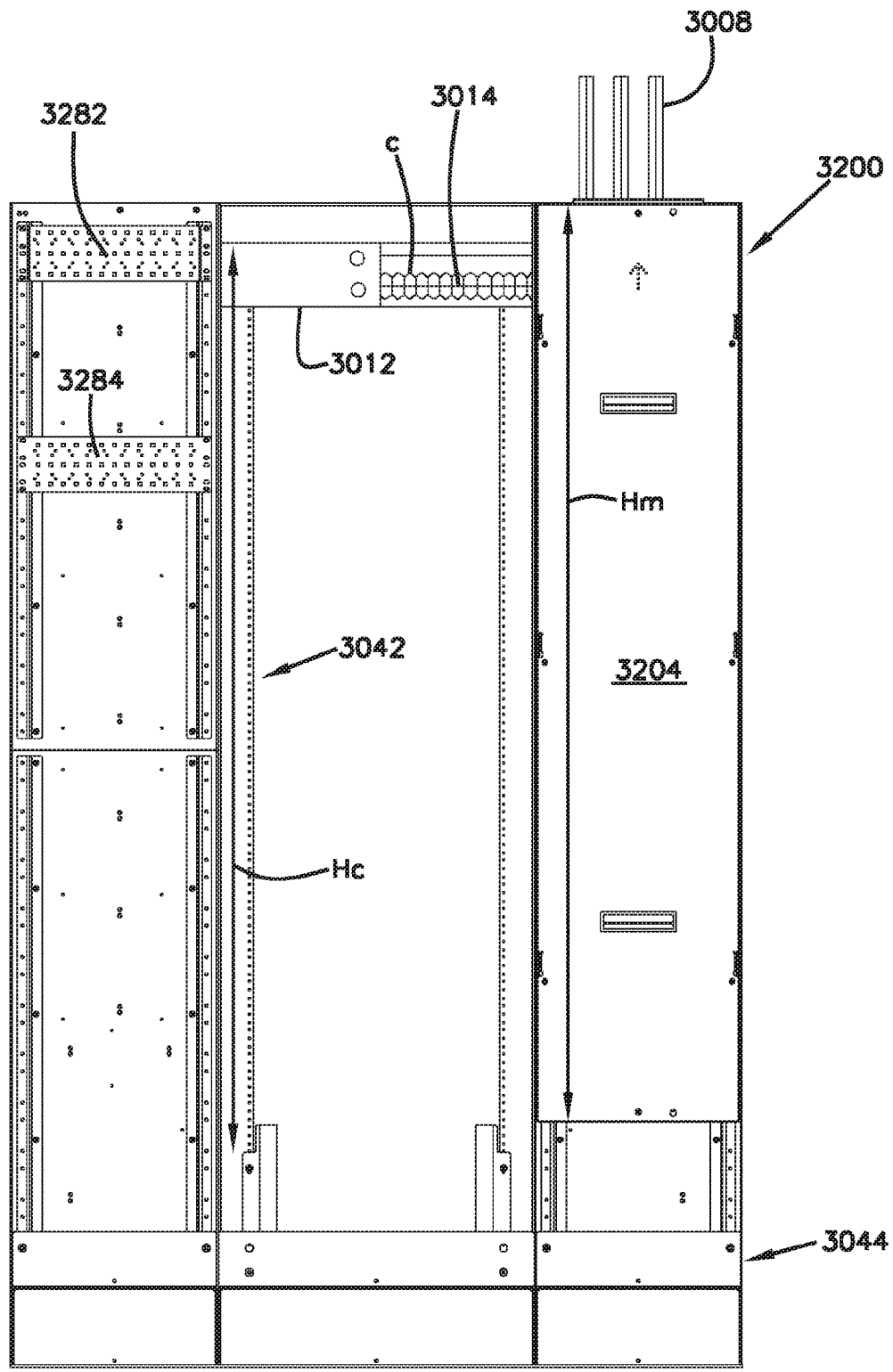
FIG. 33 is a front elevational view of the telecommunications equipment frame of FIG. 31.

FIG. 7 shows cables or cords A-D as examples. Cable A extends from the front to the rear and back to the front. Cable B shows how cables exit the frame to go elsewhere in the facility. Cable C shows how a cable can go between two frames 10. Cable D shows how a cable can pass through the two frames 10 to other frames or locations. Other variations are possible.

Central zone 40 includes a base 140, two vertical uprights 142, and a top bar 144. Vertical uprights 142 are configured for receiving equipment 12, such as with fasteners.

Slack storage zone 46 includes a slack storage body 148, including a first side 150 spaced from a second side 152 and connected by a back 154.

Slack storage zone 46 includes a lower divider 160, a first divider 162 and a second divider 164 for defining the various channels 80, 82, 84, 86.

Various cable management spools and/or radius limiters are utilized in slack storage zone 46 including a lower spool 180, a column of middle spools 182, a second lower spool 184, and an upper radius limiter 5 and lower 186, 188. Lower divider 160 encourages a technician to use a proper spool 182 for slack storage.

Front trays 60, 62, 64 generally all include a base 200, an opening 202, opposite ends 204, 206, and a front flange 208. In the illustrated embodiment, each of the front trays 60, 62, 64 have different lengths. Front trays 60, 62 have rounded ends 204, 206 in a downward direction for cable radius limiter protection. In other embodiments, the front trays 60, 62, 64 can all have the same length (see FIGS. 22-29).

Frame 10 also includes a main front base 220, and a main rear base 222 for engaging the floor of the facility.

Guides 240 define the front to rear passages 122, 124, 126. Guides 240 are received in openings 202 of front trays 60, 62, 64. Guides 240 include a base 242 with uprights 244 to provide cable radius limiter protection.

Rear trays 70, 72, 74 all generally include a base 260, a first flange 262, a spaced apart second flange 264 defining a channel, and two ends 266, 268.

Frame 10 also includes rear mounting strips 280 and a plurality of rear brackets 282, 284 for managing cables on rear 28 of frame 10, such as the incoming and outgoing cables 14. Brackets 282 are shown as U-shaped, and brackets 284 are shown as planar shapes.

When two or more frames 10 are positioned side by side, the troughs of rear 28 frame 10 generally align to present a continuous trough surface extending between adjacent frames. More than two frames can be provided and allow for cabling to extend between one frame to any other frame in the same row. Front trays 116 also align.

Patch cables are managed on the front 26 of frame 10 utilizing the slack storage zones 46 and the front trays 60, 62, 64. The front to rear pathways 122, 124, 126 allow for patch cables to move between front 26 and rear 28 of frame 10. With such a feature, patch cables can extend between different frames also using rear trays 70, 72, 74.

A technician can utilize the front trays 60, 62, 64 as desired for managing patch cables within frame 10, or between adjacent frames in a row. Also, the technician can have patch cables 16 exit frame 10 vertically and enter a cable management system, such as fiber trough system positioned above frames 10 and be transported to other areas within the facility, or to another row of frames 10. One such system is a Fiberguide Trough System by CommScope of Hickory, NC. Equipment 12 can be any or a variety of equipment, such as passive or active equipment. In one example embodiment, equipment 12 is a chassis with internal blades including connectivity equipment, such as connectors and adapters. Breakout modules and splitter modules can also be used. Further details pertaining to the bladed chasses can be found in U.S. Publication No. 2018-0224621 and U.S. Pat. No. 9,709,765, the disclosures of which are hereby incorporated herein by reference.

FIGS. 9A-E show various examples of patch cords 14 and possible pathways for the cords to follow. Cord 302 exits the equipment 12 to the left, to trough 60, pathway 102 and then pathway 122 to the rear 28 of frame 10. Cord 304 exits the equipment 12 to the right, to trough 62 to pathway 104 and then pathway 124 to the rear 28 of frame 10. Cord 306 exits the equipment 12 to the left, to channel 86 and then out of frame 10. Cord 308 exits the equipment 12 to the right, to trough 64 to pathway 106 and then horizontally to another frame 10. Cords 310, 312 exit the equipment 12 to the left, to trough 62, pathway 104 and then pathway 124 to the rear 28 of frame 10, for management together. Cord 314 exits the equipment 12 to the left, to trough 64, pathway 106 and then pathway 126 to the rear 28 of frame 10. Cord 316 exits the equipment 12 to the right, to channel 84 to pathway 126 and then horizontally out of frame 10 to another frame. Cords 318, 320 exit the equipment 12 to the left, to troughs 60 and 62 respectively, pathways 102 and 104 respectively and then pathways 122 and 124 respectively to the rear 28 of frame 10, for management separately.

A second embodiment of frame 1010 is shown in FIGS. 14-21. Similar functionality and structure is provided as in frame 10.

A third embodiment of frame 2010 is shown in FIGS. 22-30. Similar functionality and structure is provided as in frame 10. In this embodiment, the front trays 2060, 2062, 2064 all have the same length and align to form complete troughs when more than one frame 2010 is provided in a row.

With the various embodiments of frames 10, 1010, 2010, a technician can manage cables to and from equipment using both the front side and the rear side of the frames. The patch cords linking equipment 12 can be managed solely on the front side or with a combination of the front side trays and the rear side trays. The trays are located below the equipment. The trays are easily accessible for the cables via the cable slack storage systems. The equipment zone defines an obstructed space for a variety of sizes of equipment, such as in the vertical direction and in a depth direction. No front or rear troughs interfere with the equipment during assembly of the frame. No rear troughs need to be specially placed behind the equipment. All of the rear troughing is positioned in the cable tray zone away from the equipment zone. With the cable slack zones allowing for cables to pass to the trays, the technician has a variety of routing options. Such options include side to side, front to back, or out the top of the frame. Such a frame is more versatile than one designed for certain equipment with a defined height and depth. In the disclosed frames, a wide variety of equipment heights and depths can be handled without modifications to the frame.

A fourth embodiment 3010 of a frame (e.g., a telecommunications equipment frame) is shown in FIGS. 31-34. Similar functionality and structure is provided as in frame 10 except that the central zone 3040 of the frame 3010 includes a larger upper equipment zone 3042 and a smaller lower cable tray zone 3044. For example, the cable tray zone 3044 include only one front tray 3064 and one rear tray 3074.

Equipment 3012 are mountable at the upper equipment zone 3042. Equipment 3012 has incoming and outgoing cables 3014, as well as patch cables or patch cords which connect different pieces of equipment 3012 to each other, or to other telecommunications equipment. The patch cords 3016 typically are managed and connected to equipment 3012 on a front 3026 of frame 3010. The incoming and outgoing cables 3014 are typically managed on a rear 3028 of frame 3010. The patch cord 3016 also can be managed on the rear 3028 of frame 3010.

On either side of central zone 3040 are slack storage zones 3046. In the illustrated embodiment, frame 3010 includes two slack storage zones 3046 which are mirror images of one another. Slack storage zone 3046 includes cable management fingers 3048 in a vertical column dividing the slack storage zone 3046 from the central zone 3040 in the area of the equipment zone 3042. Management fingers support cables exiting horizontally from equipment 3012.

Slack storage zone 3046 includes a first cable channel 3080, a second cable channel 3082, a third cable channel 3084, and a fourth cable channel 3086. These channels are generally vertically oriented for handling cables. Each slack storage zone 3046 includes a lower divider 3160, a first divider 3162 and a second divider 3164 for defining the various channels 3080, 3082, 3084, 3086. Various cable management spools and/or radius limiters are utilized in each slack storage zone 3046 including a lower spool 3180, a column of middle spools 3182, one or more second lower spools 3184, an upper radius limiter 3186, and a lower radius limiter 3188. The lower divider 3160 encourages a technician to use a proper spool 3182 for slack storage.

In accordance with some aspects of the disclosure, a splice equipment assembly 3200 can be mounted at the rear 3028 of the frame 3010. For example, the splice equipment assembly 3200 can be mounted at the rear 3028 to one side of the central zone 3040. Cables on rear 3028 of frame 3010, such as the incoming and outgoing cables 3014, can be spliced to one or more trunk cables 3008 routed to the frame 3010.

Frame 3010 also may include one or more rear mounting strips and/or a plurality of rear brackets 3282, 3284 at the rear of the frame 3010 at the opposite side of the central zone 3040. Brackets 3282 are shown as U-shaped, and brackets 3284 are shown as planar shapes.

Figure 34:
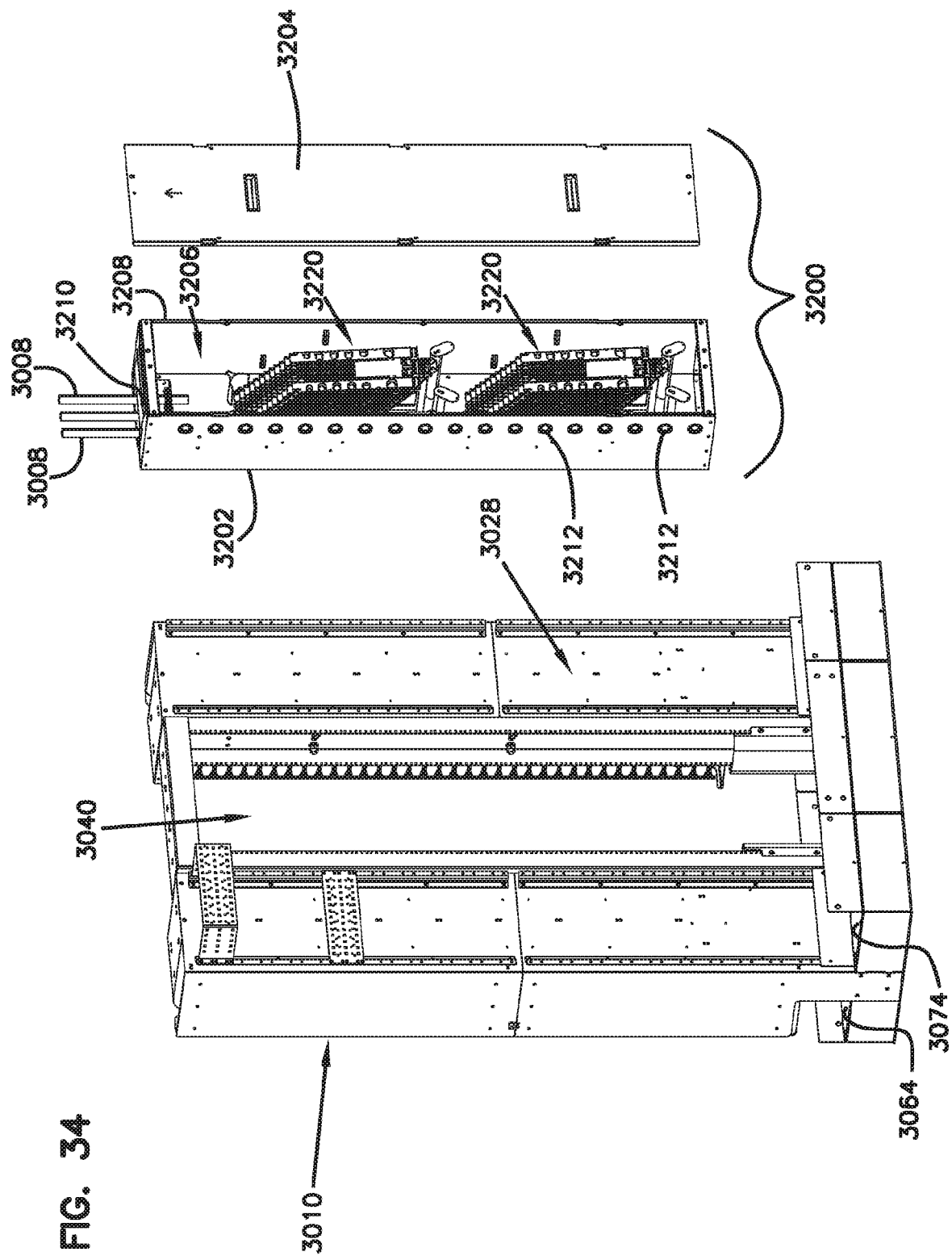
FIG. 34 is a rear perspective view of the telecommunications equipment frame of FIG. 31 with a splice equipment assembly exploded rearwardly from the frame and a cover exploded away from the splice equipment assembly.

As shown in FIG. 34, the splice equipment assembly 3200 includes a body 3202 and a cover 3204. The body 3202 defines an interior 3206 accessible through an access aperture 3208. The cover 3204 is movable to selectively cover and expose the access aperture 3208. In some examples, the cover 3204 is pivotable relative to the body 3202. In other examples, the cover 3204 is removable from the body 3202 (e.g., by lifting the cover 3204 to free tabs of the cover 3204 from slots defined by the body 3202).

The body 3202 also defines a trunk cable port arrangement 3210 through which the trunk cables 3008 may extend into the interior 3206 of the splice equipment assembly 3200 and at least one equipment cable port 3212 through which the incoming and outgoing cables 3014 of the equipment 3012 may extend into the interior 3206 of the splice equipment assembly 3200. One or more splice trays 3224 are disposed within the interior 3206. The trunk cables 3008 are optically coupled to the incoming and outgoing cables 3014 at the splice trays 3224. A user may access the splice trays 3224 through the access aperture 3208.

In certain examples, the incoming and outgoing cables 3014 include fibers or fiber ribbons disposed within protective sleeving (e.g., mesh sleeves). The protective sleeving may have first ends disposed within the equipment 3012 and second ends that are disposed within the splice equipment assembly 3200 when the incoming and outgoing cables 3014 are routed to the splice trays 3224 within the splice equipment assembly 3200. In certain examples, the second ends of the protective sleeving may be routed to the respective splice trays 3224. In an example, the second ends of the protective sleeving may be anchored to the respective splice trays 3224.

In certain implementations, a conduit C may be positioned around the incoming and outgoing cables 3014 between the equipment 3012 and the splice equipment assembly 3200. In certain examples, the conduit C includes a corrugated tube (e.g., a plastic tube). In certain examples, the conduit C is slit to enable lateral mounting of the conduit C about the cables 3014. In some examples, the conduit C surrounds the protective sleeving disposed about the incoming and outgoing cables 3014. In other examples, the incoming and outgoing cables 3014 within the conduit C do not have protective sleeving.

In some examples, the conduit C extends to the equipment cable port 3212. In certain examples, the conduit C extends at least partially through the equipment cable port 3212. In an example, an end of the conduit C is secured at the equipment cable port 3212 (e.g., clamped at a plug received in the equipment cable port 3212). In other examples, the conduit C extends through the equipment cable port 3212 and into an interior 3206 of the splice equipment assembly 3200. In some examples, the conduit C extends from an interior of the equipment 3012. In other examples, the conduit C extends from an exterior of the equipment 3012 adjacent an exit cable port.

In certain implementations, the body 3202 of the splice equipment assembly 3200 includes a rear wall 3230, a first side wall 3232, an opposite second side wall 3234, a bottom wall 3236, and a top wall 3238. In certain examples, the access aperture 3208 is generally defined by edges of the first side wall 3232, the second side wall 3234, the bottom wall 3236, and the top wall 3238. Retaining lips 3240 may extend into the access aperture 3208 from the bottom wall 3236 and/or from the top wall 3238.

In certain examples, the trunk cable port arrangement 3210 is disposed at the top wall 3238. In some examples, the trunk cable port arrangement 3210 includes a single aperture through which multiple trunk cables 3008 may extend. In other examples, the trunk cable port arrangement 3210 includes a plurality of apertures through which respective trunk cables may extend. In some examples, the trunk cable port arrangement 3210 is environmentally sealed. In other examples, the trunk cable port arrangement 3210 may include a non-sealing cover 3214 to inhibit dust or other such contaminants from entering the splice enclosure. In an example, the cover 3214 includes a brush-style element extending across the one or more apertures of the trunk cable port arrangement 3210.

In certain implementations, the trunk cables 3008 may be anchored within the interior 3206 of the splice equipment assembly 3200. For example, an anchor block 3260 may be disposed within the splice equipment assembly 3200 (e.g., at the rear wall 3230). One or more clamps 3262 are mounted to the anchor block 3260 to hold the trunk cables 3008 to the anchor block 3260. In certain examples, the anchor block 3260 is disposed at an upper portion of the splice module interior 3206 adjacent the trunk cable port arrangement 3210.

In some implementations, the splice equipment assembly 3200 has a height $H_M$ that extends along a majority of a height $H_C$ of the upper equipment zone 3042. In certain implementations, the height $H_M$ is substantially the same as the height $H_C$ of the upper equipment zone 3042. In certain examples, the height $H_M$ of the splice equipment assembly 3200 extends along a majority of a height of the frame 3010. In certain examples, the height $H_M$ of the splice equipment assembly 3200 is sufficient to enable spacing of the equipment cable ports 3212 along the side of the upper equipment zone 3042 so that incoming and outgoing cables 3014 can extend generally straight between the respective equipment 3012 and a respective equipment cable port 3212 (e.g., see FIG. 33).

Figure 35:
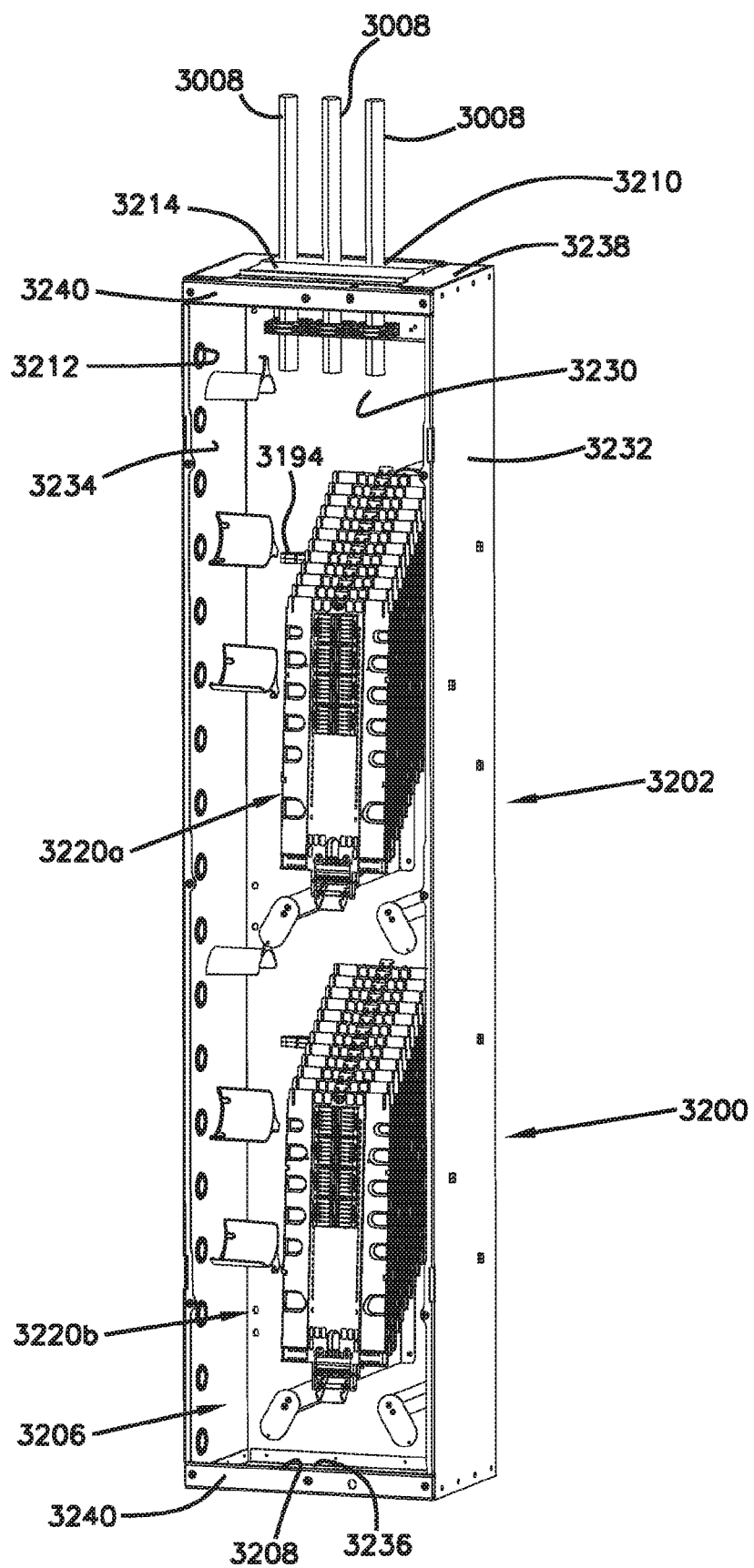
FIG. 35 is a perspective view of an example splice equipment assembly with an access cover removed so that the interior is visible.
Figure 36:
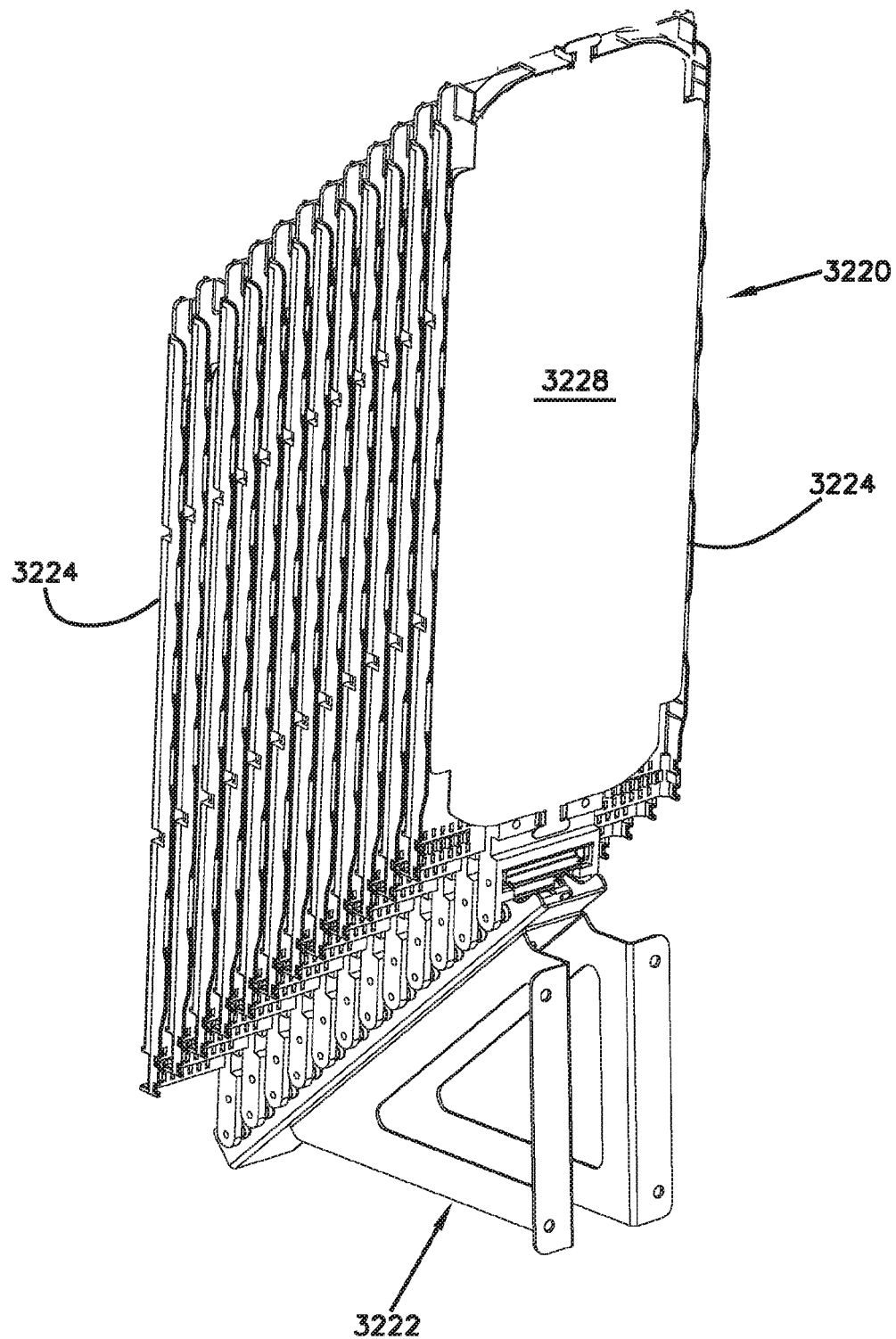
FIG. 36 is a first perspective view of an example splice tray assembly including a plurality of splice trays mounted to a frame.
Figure 37:
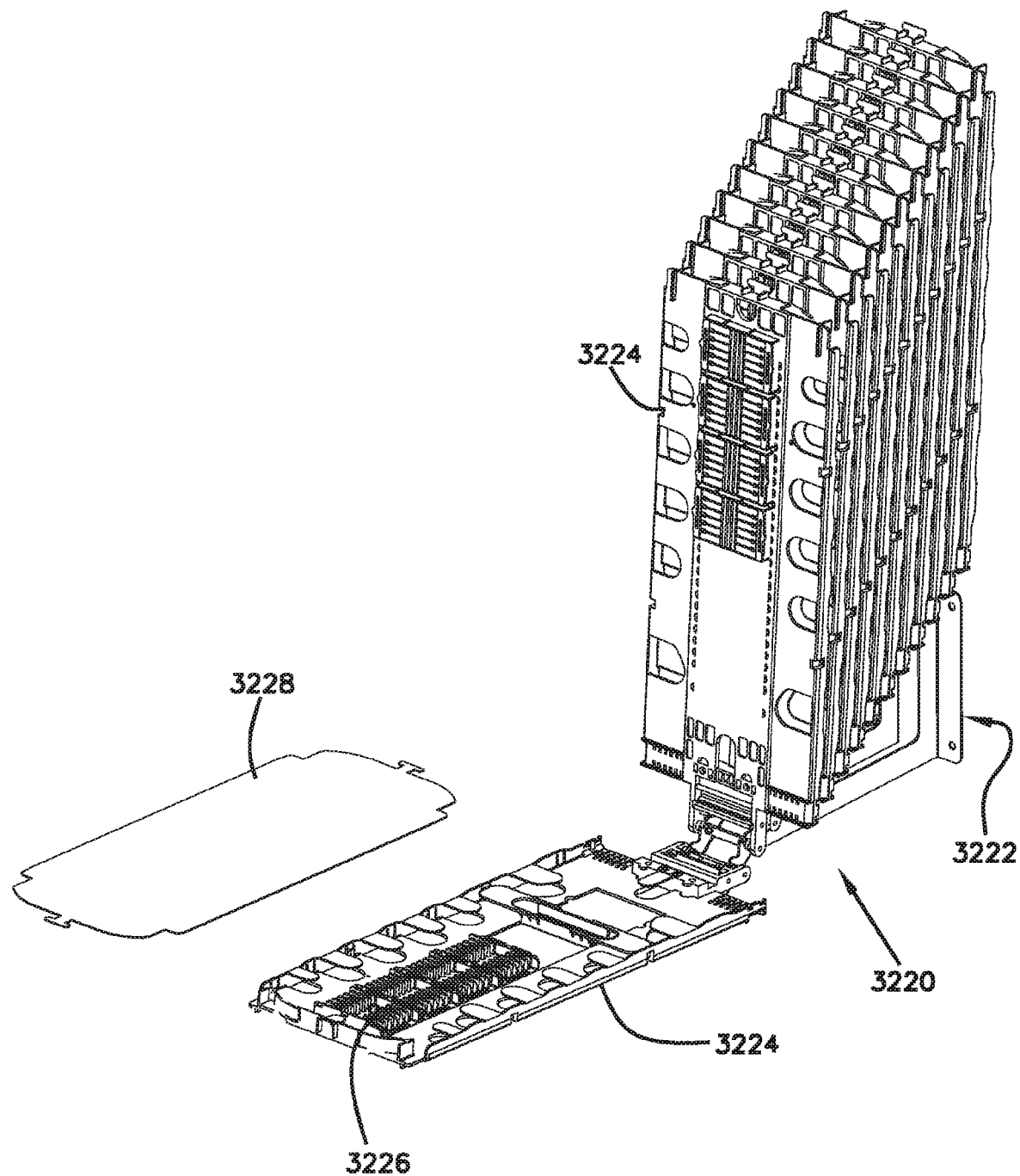
FIG. 37 is a second perspective view of the example splice tray assembly of FIG. 36 showing one splice tray in an access position and the remaining splice trays in a stowed position, a cover being removed from the splice tray in the access position so that splice holders are visible.

As shown in FIGS. 35-37, the splice trays 3224 can be organized into one or more splice tray assemblies 3220. Each splice tray assembly 3220 includes one or more splice trays 3224 coupled to a mounting frame 3222. In certain examples, the mounting frame 3222 secures to the rear wall 3230. In certain examples, the trays 3224 are staggered along the mounting frame 3222 for easier access. For example, each tray 3224 may be mounted at a different position along a ramped surface of the frame 3222. In certain examples, the splice trays 3224 are removably mounted to the frame 3222 so that one or more of the trays 3224 can be removed from the frame 3222 and moved to a nearby work surface without disconnecting the already spliced cables.

In certain implementations, each splice tray 3224 has a first major side and a second major side. The first major side includes splice holders 3226 at which optical splices can be stored. A removable cover 3228 can be disposed at the first major side to cover the splice holders (see FIG. 37).

Each tray 3224 may be separately movable relative to the frame 3222 between a stowed position and an access position. For example, in FIG. 37, a forward-most tray 3224 is disposed in the access position while the remaining trays 3224 of the splice tray assembly 3220 are disposed in the stowed position. When in the access position, the first major side of the tray 3224 is accessible to a technician. When in the stowed position, the first major side faces the rear of the splice equipment assembly 3200 while the second major side faces the access aperture 3208.

Referring to FIGS. 35 and 38-40, certain implementations of the splice equipment assembly 3200 includes a cable routing arrangement 3250 that facilitates routing the cables 3008, 3014 from the cable ports 3210, 3212 to the splice trays 3224. In some implementations, the cable routing arrangement 3250 includes various routing guides that define at least a first routing path P1 between the trunk cable port arrangement 3210 and at least one splice tray 3224 and a second routing path P2 between an equipment cable port 3212 and the at least one splice tray 3224 (see FIG. 38).

In certain implementations, the second routing path P2 is configured such that the incoming and outgoing cables 3014 of the equipment 3012 have a common length. For example, in such implementations, the incoming and outgoing cables 3014 routed to equipment 3012 mounted at a top of the frame 3222 have common lengths with the incoming and outgoing cables 3014 routed to equipment 3012 mounted at a middle of the frame 3222. In certain examples, sufficient slack length of each incoming and outgoing cables 3014 is accommodated along the second routing path P2 to enable the incoming and outgoing cables 3014 to have common lengths.

In certain implementations, the first routing path P1 extends at least partially along the first side wall 3232 and does not extend along the second side wall 3234 while the second routing path P2 extends at least partially along the second side wall 3234 and does not extend along the first side wall 3232. In certain examples, the first routing path P1 extends at least partially along the rear wall 3230. In certain examples, the second routing path P2 extends at least partially along the rear wall 3230. In certain implementations, none of the routing paths P1, P2 extend circumferentially around the splice trays 3224. In certain implementations, the first routing path P1 and the second routing path P2 do not cross or otherwise overlap each other. Advantageously, by not crossing or otherwise overlapping the routing paths P1, P2, a splice tray 3224 to which fibers are routed can be more easily removed from the splice equipment assembly 3200 without disconnecting the fibers from the splice tray 3224.

In certain implementations, multiple groups 3220 of splice trays 3224 are disposed within the interior 3206 of the splice equipment assembly 3200. In some such implementations, separate first routing paths lead from the trunk cable port arrangement 3210 to the respective splice tray assemblies 3220 and separate second routing paths lead from certain ones of the equipment ports 3212 to the respective splice tray assemblies 3220.

In certain examples, the interior 3206 of the splice equipment assembly 3200 includes a plurality of regions, each region has a respective splice tray assembly 3220. In examples, each region has respective first and second cable routing paths P1, P2 to the splice tray assembly 3220. In an example, each region has a respective set of equipment cable ports 3212. In the example shown, a first region R1 is disposed above a second region R2. In other examples, the splice equipment assembly 3200 may include additional regions. In certain examples, the regions are disposed in a vertical column.

In certain implementations, the first routing path P1 is configured such that the trunk cables 3008 have a common length. For example, the trunk cables 3008 routed to the splice tray assembly 3220 at the first region R1 have a common length with the trunk cables 3008 routed to the splice tray assembly 3220 at the second region R2. In certain examples, sufficient slack length of each trunk cables 3008 is accommodated along the first routing path P1 to enable the trunk cables 3008 to have common lengths.

For example, in FIG. 36, one first routing path P1a extends from the trunk cable port arrangement 3210 towards a first splice tray assembly 3220a (FIG. 35) in the first region R1 and another first routing path P1b extends from the trunk cable port arrangement 3210 towards a second splice tray assembly 3220b (FIG. 35) in the second region R2. One second routing path P2a extends from an equipment cable port 3212 towards the first splice tray assembly 3220a in the first region R1 and another second routing path P2b extends from another equipment cable port 3212 towards the second splice tray assembly 3220b in the second region R2.

In certain implementations, the splice tray splice tray assemblies 3220 are disposed within the interior 3206 so that for each first routing path P1, a majority of the path does not overlap with the other first routing paths P1. In certain implementations, the splice tray assemblies 3220 are disposed within the interior 3206 so that for each second routing path P2, a majority of the path does not overlap with the other second routing paths P2. In certain examples, the first splice tray assembly 3220a is disposed above the second splice tray assembly 3220b. In such examples, one set of first and second cable routing paths P1a, P2a may be disposed above a majority of another set of first and second cable routing paths P1b, P2b.

In certain implementations, one of the second routing paths P2a is provided for fibers extending from any of a first set 3212a (FIG. 39) of the equipment cable ports 3212 and another of the second cable routing paths P2b is provided for fibers extending from any of a second set 3212b (FIG. 39) of the equipment cable ports 3212.

In certain implementations, the cable routing arrangement 3250 includes a combination of bend radius limiters 3252, 3256 and cable clips 3254. For example, various bend radius limiters 3252, 3256 may be disposed at upper and/or lower portions of the cable routing paths P1, P2 to create multiple loops or layers within the path. The cable clips 3254 manage the fibers along the paths P1, P2.

Figure 38:
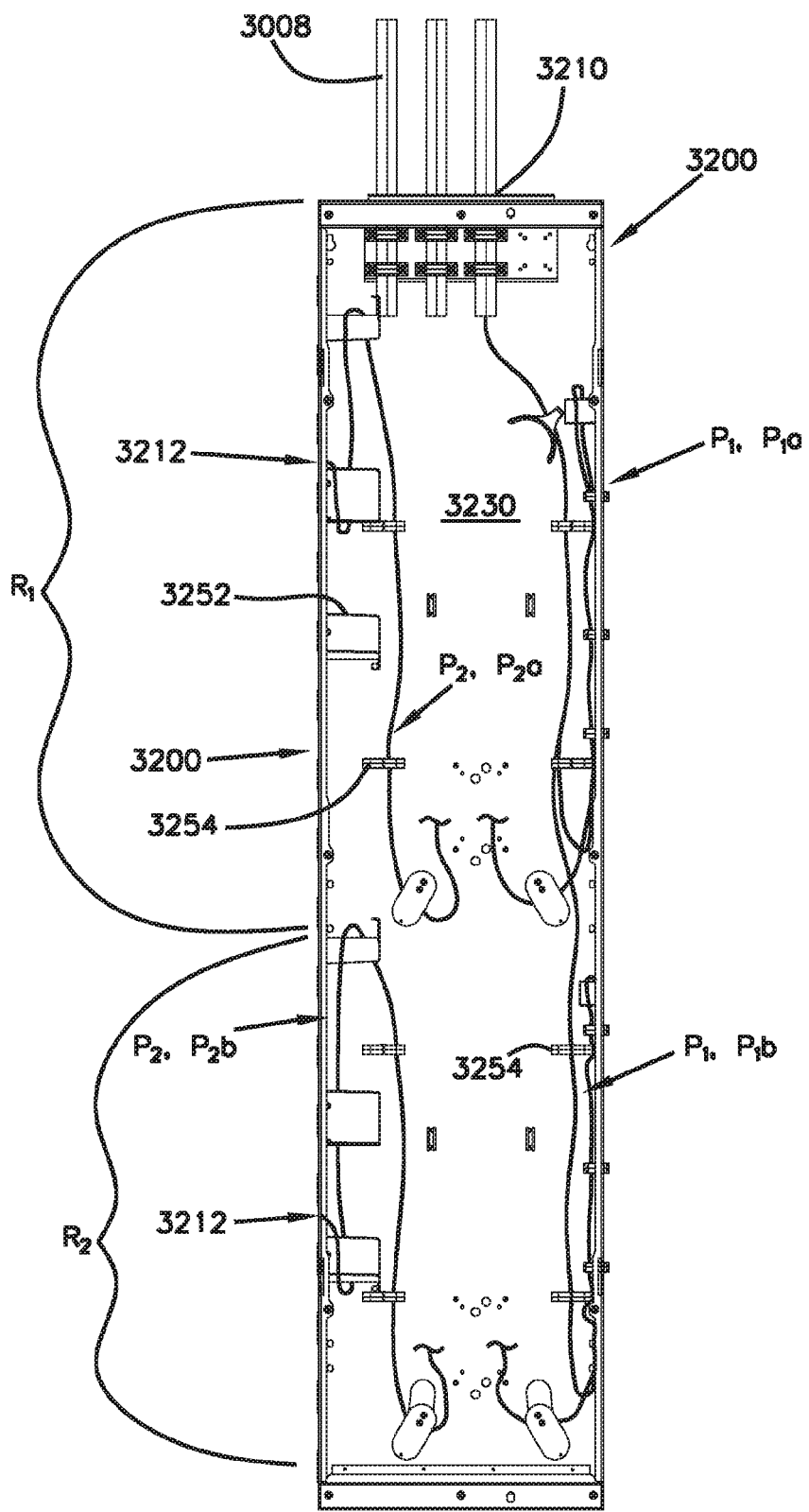
FIG. 38 is an elevational view of the splice equipment assembly of FIG. 35 with the splice tray assemblies removed for ease in viewing the cable routing paths.
Figure 39:
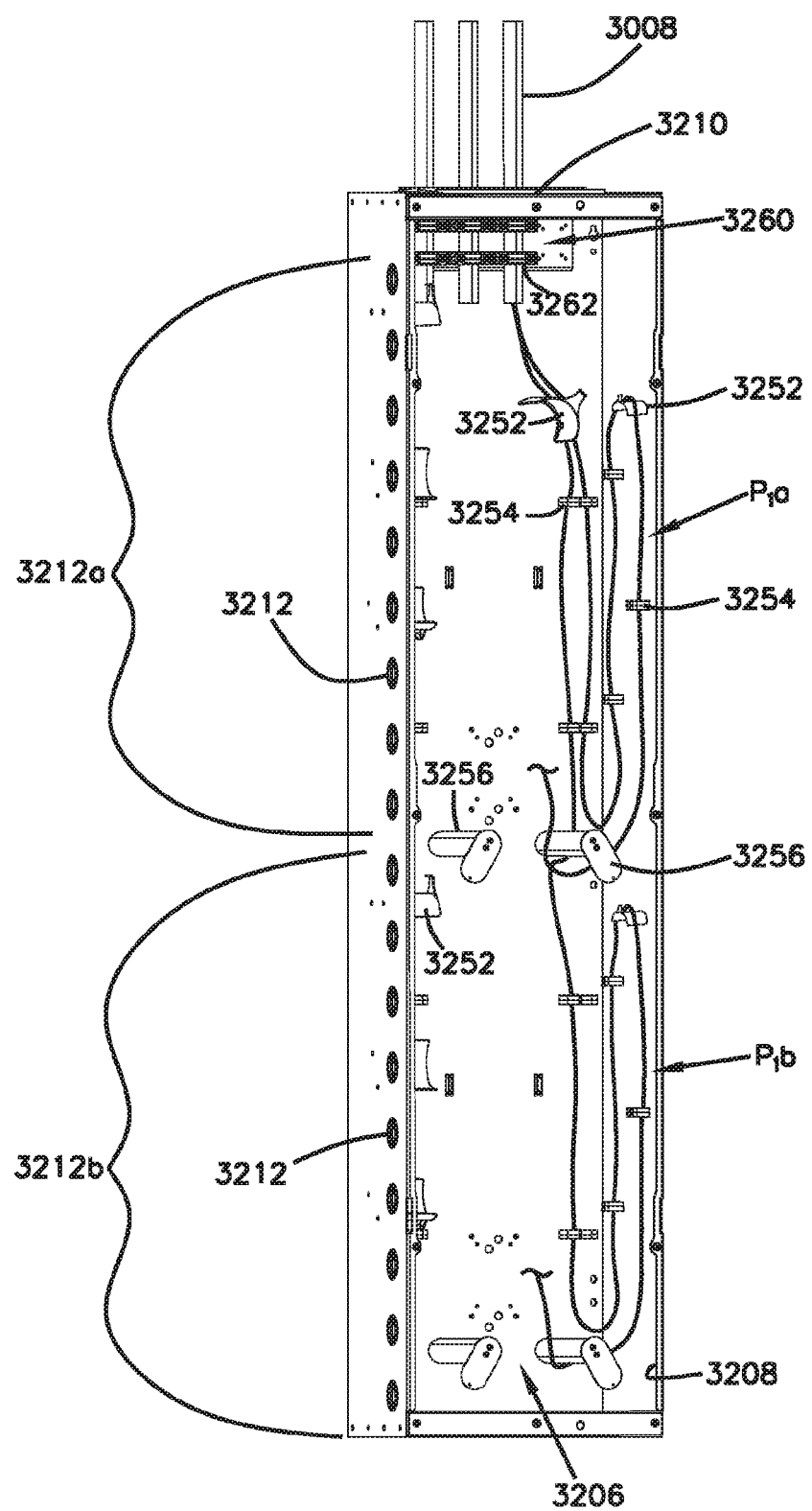
FIG. 39 is another perspective view of the splice equipment assembly of FIG. 35 showing examples of the first cable routing paths.

In the example shown in FIGS. 38 and 39, an example first cable routing path P1a extends from the trunk cable port arrangement 3210 and at least partially down the rear wall 3230. The first cable routing path P1 loops back up an inner surface of the first side wall 3232 towards the rear, loops over a bend radius limiter 3252, and extends back down the inner surface of the first side wall 3232. Finally, the first cable routing path P1 extends from the first side wall 3232, around a spool 3256 or other bend radius limiter and up towards a splice tray 3224. Cable clips 3254 may be disposed at the rear wall 3230 and the inner surface of the first side wall 3232 to hold the fibers at the respective walls. A half spool 3252 or other bend radius limiter may be disposed at the real wall 3230 above the first splice tray assembly 3220 of splice trays 3224 to guide the fibers from the trunk cable to a side of the splice trays 3224. In certain examples, the spool 3256 is sufficiently deep to facilitate routing the trunk cable fibers to any of the splice trays 3224 in the splice tray assembly 3220.

Figure 40:
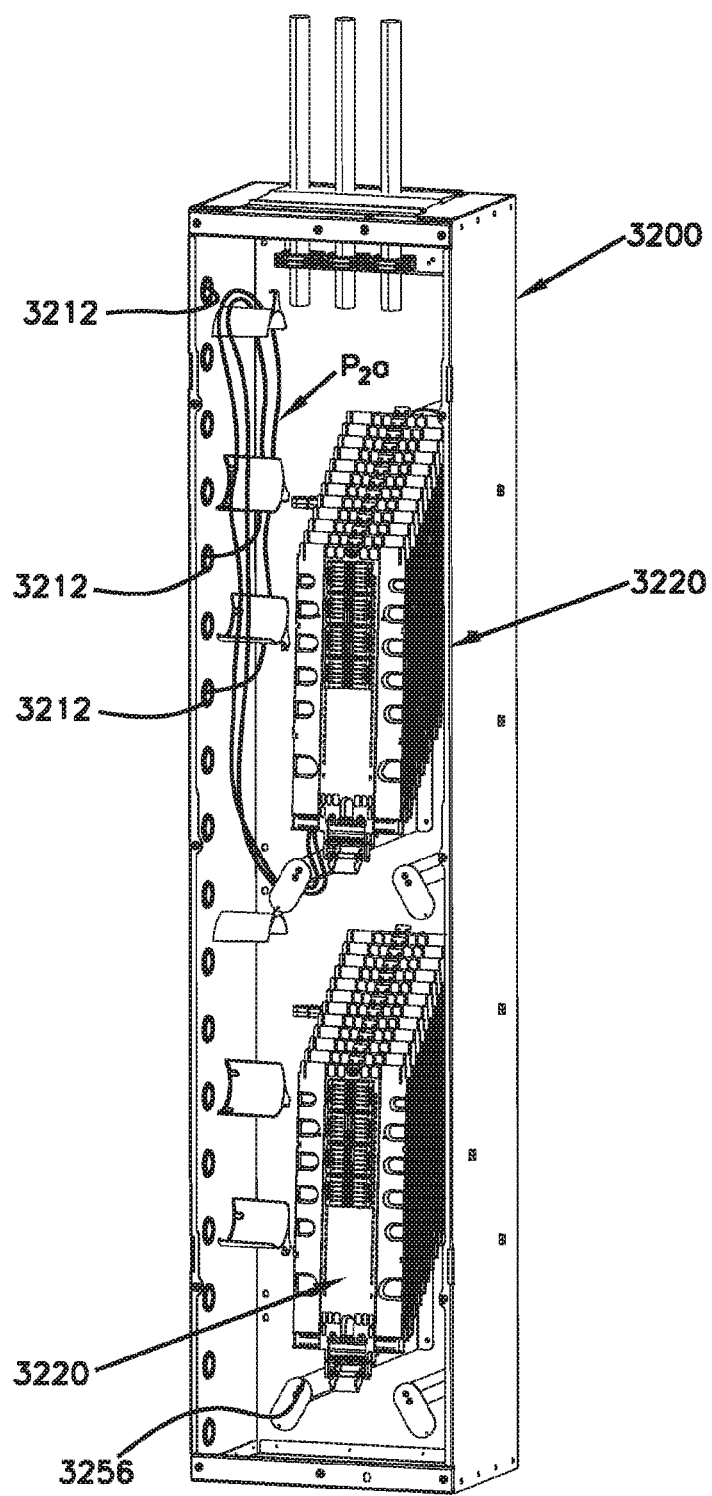
FIG. 40 is a perspective view of an example splice equipment assembly of FIG. 35 showing examples of the second cable routing paths.

In the example shown in FIGS. 38 and 40, an example second cable routing path P2a extends from the equipment cable ports 3212, up an inner surface of the second side wall 3234, over a half-spool 3252 or other bend radius limiter, down the inner surface of the second side wall 3234, around a spool 3256 or other bend radius limiter, and up to the splice trays 3224. In certain examples, additional half-spools 3252 or other bend radius limiters may be disposed at the inner surface of the second side wall 3234 to separate the fibers routed up the second side wall 3234 and the fibers routed down the second side wall 3234. The additional radius limiters also may guide the equipment cable fibers from the equipment cable ports 3212 to the upward section of the path towards the rear side of the second side wall 3234.

In some implementations, optical splicing between the equipment cable fibers and the trunk cable fibers is performed while the splice tray 3224 is mounted to the frame 3222 within the splice equipment assembly 3200. For example, the desired splice tray 3224 can be pivoted or otherwise moved to the access position, the cover 3228 can be removed, and the optical splices can be mounted to the tray 3224. In other implementations, the splice tray 3224 is removed from the splice equipment assembly 3200 to optically splice the equipment cable fibers and the trunk cable fibers. For example, the fibers routed to the splice tray 3224 can be unhooked from the radius limiter 3256 to enable the splice tray 3224 to be removed from the frame 3222 and moved to a work station external of the splice equipment assembly 3200.

Various examples have been described in detail with reference to the drawings, wherein like reference numerals represent like parts and assemblies throughout the several views. Any examples set forth in this disclosure are not intended to be limiting and merely set forth some of the many possible ways for implementing the broad inventive aspects disclosed herein.

We claim:

1. A splice equipment assembly comprising:
  a housing having a height extending between a top and a bottom, a width extending between a first side and a second side, and a depth extending between a rear and an open front providing access to an interior of the housing;

a trunk cable port disposed at the top of the housing to provide access to the interior of the housing;

at least one equipment cable port disposed at the second side of the housing to provide access to the interior of the housing;

a splice tray assembly disposed within the housing, the splice tray assembly including a frame and a plurality of splice trays mounted to the frame, each splice tray being movable between a stowed position and an access position;

a first guide member arrangement disposed at an inner surface at the first side of the housing to define a first cable routing path between the trunk cable port and the splice tray assembly; and a second guide member arrangement disposed at an inner surface at the second side of the housing to define a second cable routing path between the at least one equipment cable port and the splice tray assembly, the second cable routing path not overlapping the first cable routing path;

wherein the interior of the housing includes a first region and a second region that is spaced apart from and disposed below the first region along a vertical column, wherein the splice tray assembly is a first splice tray assembly disposed in the first region, and wherein a second splice tray assembly is mounted within the housing in the second region that is positioned below the first region along a vertical column, wherein the first cable routing path extends along the first side and the rear of the housing, and wherein the second cable routing path extends along the second side and the rear of the housing, wherein a plurality of splice trays of the second splice tray assembly is spaced apart from the plurality of splice trays of the first splice tray assembly, wherein the first and second cable routing paths service the first region, and wherein additional first and second cable routing paths service the second region, each of the first cable routing paths generally aligned along a vertical column and positioned between the first and second splice tray assemblies and the first side of the housing, and each of the second cable routing paths generally aligned along a vertical column and positioned between the first and second splice tray assemblies and the second side of the housing, wherein each of the splice trays of the plurality of splice trays of the first splice tray assembly and the plurality of splice trays of the second splice tray assembly is mounted to the housing so as to be separately pivotable between the stowed position and the access position about a pivot axis that is parallel to a direction extending from the first side toward the second side of the housing and that is perpendicular to the vertical columns defined within the housing;

wherein each of the splice trays of the plurality of splice trays of the first splice tray assembly and the plurality of splice trays of the second splice tray assembly is mounted to the housing such that first and second major faces of each splice tray are oriented perpendicular to a plane defined along the vertical columns within the housing and parallel to the direction extending from the first side toward the second side of the housing; and wherein the at least one equipment cable port is one of a plurality of equipment cable ports extending through the second side of the housing, the plurality of equipment cable ports being disposed in a vertical column and being spaced along a majority of a height of the second side, wherein the first and second splice tray assemblies are positioned within the housing and aligned along a single vertical column so as to span a majority of all the equipment cable ports that are provided on the second side of the housing.

2. The splice equipment assembly of claim 1, wherein each of the first splice tray assembly and the second splice tray assembly is mounted to the rear of the housing.

3. The splice equipment assembly of claim 1, wherein neither the first cable routing path nor the second cable routing path extend circumferentially around the first and second splice tray assemblies.

4. A telecommunications equipment frame comprising the splice equipment assembly of claim 1.

5. The telecommunications equipment frame of claim 4, further comprising:
  a base, two vertical upright members, and a top member defining a central zone;
  the upright members further defining an upper equipment zone;
  the upright members further defining a lower cable tray zone;
  one or more front trays in the cable tray zone, and openings through the frame to one or more rear trays;
  wherein the upper equipment zone defined by the two upright members is open without cable management structure for receiving telecommunications equipment; and
  at least one slack storage zone adjacent to the central zone including a plurality of cable management devices for storing cable slack, the splice equipment assembly being disposed opposite the at least one slack storage zone.

6. The telecommunications equipment frame of claim 5, further comprising a second slack storage zone on an opposite side of the central zone relative to the first slack storage zone.

7. The telecommunications equipment frame of claim 6, wherein each slack storage zone includes a column of spools.

8. The telecommunications equipment frame of claim 5, wherein the one or more front trays have different lengths.

9. The telecommunications equipment frame of claim 5, wherein the one or more front trays all have the same length.

10. The telecommunications equipment frame of claim 5, wherein the one or more front trays include only a single front tray.

11. The telecommunications equipment frame of claim 5, wherein the one or more rear trays include only a single rear tray.

12. The telecommunications equipment frame of claim 5, wherein the splice equipment assembly is mounted to the frame and offset from the central zone.

13. The telecommunications equipment frame of claim 12, wherein the at least one equipment cable port of the splice equipment assembly faces towards the central zone and the trunk cable port faces in a different direction from the at least one equipment cable port.

14. The telecommunications equipment frame of claim 13, wherein the at least one equipment cable port includes a plurality of equipment cable ports, and wherein each of the equipment cable ports aligns with telecommunications equipment received in the upper equipment zone.

15. The telecommunications equipment frame of claim 4, further comprising telecommunications equipment.

* * * * *

UNITED STATES PATENT AND TRADEMARK OFFICE
CERTIFICATE OF CORRECTION

| | | |
|---|---|---|
| PATENT NO. | : 12,169,318 B2 | Page 1 of 1 |
| APPLICATION NO. | : 17/269656 | |
| DATED | : December 17, 2024 | |
| INVENTOR(S) | : James J. Solheid et al. | |

It is certified that error appears in the above-identified patent and that said Letters Patent is hereby corrected as shown below:

In the Claims

Column 12, Line 26, Claim 5: "is open without cable" should read --is open without a cable--

Signed and Sealed this
Twenty-second Day of April, 2025

Coke Morgan Stewart
*Acting Director of the United States Patent and Trademark Office*